United States Patent
Kozicki et al.

(10) Patent No.: US 11,127,694 B2
(45) Date of Patent: Sep. 21, 2021

(54) PHYSICAL UNCLONABLE FUNCTIONS WITH COPPER-SILICON OXIDE PROGRAMMABLE METALLIZATION CELLS

(71) Applicants: Michael Kozicki, Phoenix, AZ (US); Wenhao Chen, Folsom, CA (US)

(72) Inventors: Michael Kozicki, Phoenix, AZ (US); Wenhao Chen, Folsom, CA (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/496,767

(22) PCT Filed: Mar. 23, 2018

(86) PCT No.: PCT/US2018/024156
§ 371 (c)(1),
(2) Date: Sep. 23, 2019

(87) PCT Pub. No.: WO2018/175973
PCT Pub. Date: Sep. 27, 2018

(65) Prior Publication Data
US 2020/0381372 A1 Dec. 3, 2020

Related U.S. Application Data

(60) Provisional application No. 62/475,725, filed on Mar. 23, 2017.

(51) Int. Cl.
*H01L 23/00* (2006.01)
*H01L 27/24* (2006.01)
*H01L 45/00* (2006.01)

(52) U.S. Cl.
CPC ........ *H01L 23/573* (2013.01); *H01L 27/2463* (2013.01); *H01L 45/085* (2013.01);
(Continued)

(58) Field of Classification Search
CPC . H01L 23/573; H01L 23/576; H01L 27/2463; H01L 27/2472; H01L 27/2436; H01L 45/1233
See application file for complete search history.

(56) References Cited

U.S. PATENT DOCUMENTS 4,904,338 A  2/1990 Kozicki
5,314,772 A  5/1994 Kozicki et al.
(Continued)

FOREIGN PATENT DOCUMENTS

KR   101566949 B1   11/2015
WO   WO1997048032 A2   12/1997
(Continued)

OTHER PUBLICATIONS

English machine translation of Kang et al. (KR10166949B1, dated Jun. 30, 2014) cited in the IDS filed Dec. 17, 2020.*
(Continued)

*Primary Examiner* — Zandra V Smith
*Assistant Examiner* — John M Parker
(74) *Attorney, Agent, or Firm* — Michael Best & Friedrich LLP

(57) ABSTRACT

A physical unclonable functions (PUF) device including a first copper electrode, a second electrode, and a silicon oxide layer positioned directly between the first copper electrode and the second electrode; a method of producing a PUF device; an array comprising a PUF device; and a method of generating a secure key with a plurality of PUF devices.

12 Claims, 11 Drawing Sheets

(52) U.S. Cl.
CPC ...... *H01L 45/1233* (2013.01); *H01L 45/1266* (2013.01); *H01L 45/145* (2013.01); *H01L 45/1616* (2013.01); *H01L 45/1625* (2013.01); *H01L 45/1641* (2013.01)

(56) References Cited

U.S. PATENT DOCUMENTS

| | | |
|---|---|---|
| 5,434,917 A | 7/1995 | Naccache et al. |
| 5,761,115 A | 6/1998 | Kozicki et al. |
| 5,896,312 A | 4/1999 | Kozicki et al. |
| 5,914,893 A | 6/1999 | Kozicki et al. |
| 6,084,796 A | 7/2000 | Kozicki et al. |
| 6,388,324 B2 | 5/2002 | Kozicki |
| 6,418,049 B1 | 7/2002 | Kozicki et al. |
| 6,469,364 B1 | 10/2002 | Kozicki |
| 6,487,106 B1 | 11/2002 | Kozicki |
| 6,635,914 B2 | 10/2003 | Kozicki et al. |
| 6,798,692 B2 | 9/2004 | Kozicki et al. |
| 6,825,489 B2 | 11/2004 | Kozicki |
| 6,865,117 B2 | 3/2005 | Kozicki |
| 6,914,802 B2 | 7/2005 | Kozicki |
| 6,927,411 B2 | 8/2005 | Kozicki |
| 6,940,745 B2 | 9/2005 | Kozicki |
| 6,985,378 B2 | 1/2006 | Kozicki |
| 6,998,312 B2 | 2/2006 | Kozicki et al. |
| 7,006,376 B2 | 2/2006 | Kozicki |
| 7,085,928 B1 | 8/2006 | Schmid et al. |
| 7,101,728 B2 | 9/2006 | Kozicki et al. |
| 7,142,450 B2 | 11/2006 | Kozicki et al. |
| 7,145,794 B2 | 12/2006 | Kozicki |
| 7,169,635 B2 | 1/2007 | Kozicki et al. |
| 7,180,104 B2 | 2/2007 | Kozicki |
| 7,227,169 B2 | 6/2007 | Kozicki |
| 7,288,781 B2 | 10/2007 | Kozicki |
| 7,294,875 B2 | 11/2007 | Kozicki |
| 7,372,065 B2 | 5/2008 | Kozicki et al. |
| 7,385,219 B2 | 6/2008 | Kozicki et al. |
| 7,402,847 B2 | 7/2008 | Kozicki et al. |
| 7,405,967 B2 | 7/2008 | Kozicki et al. |
| 7,560,722 B2 | 7/2009 | Kozicki |
| 7,675,766 B2 | 3/2010 | Kozicki |
| 7,728,322 B2 | 6/2010 | Kozicki |
| 7,763,158 B2 | 7/2010 | Kozicki |
| 7,929,331 B2 | 4/2011 | Kozicki |
| 8,022,384 B2 | 9/2011 | Kozicki |
| 8,134,140 B2 | 3/2012 | Kozicki |
| 8,213,217 B2 | 7/2012 | Kozicki |
| 8,213,218 B2 | 7/2012 | Kozicki |
| 8,218,350 B2 | 7/2012 | Kozicki |
| 8,300,450 B2 | 10/2012 | Christensen et al. |
| 8,742,531 B2 | 6/2014 | Kozicki |
| 8,941,089 B2 | 1/2015 | Gopalan et al. |
| 8,999,819 B2 | 4/2015 | Kozicki et al. |
| 9,165,644 B2 | 10/2015 | Kamalanathan et al. |
| 9,502,356 B1 * | 11/2016 | Parvarandeh ......... H01L 23/544 |
| 9,773,141 B2 | 9/2017 | Kozicki |
| 9,836,633 B2 | 12/2017 | Kozicki |
| 9,852,791 B1 * | 12/2017 | Tseng .................... H04L 9/0866 |
| 9,971,566 B2 | 5/2018 | Cambou |
| 9,985,791 B2 | 5/2018 | Cambou |
| 10,074,000 B2 | 9/2018 | Kozicki |
| 10,090,840 B1 | 10/2018 | Lee et al. |
| 10,223,567 B2 | 3/2019 | Kozicki |
| 10,466,969 B2 | 11/2019 | Kozicki et al. |
| 10,467,447 B1 | 11/2019 | Kozicki |
| 10,558,172 B2 | 2/2020 | Kozicki |
| 10,644,892 B2 | 6/2020 | Afghah et al. |
| 10,710,070 B2 | 7/2020 | Kozicki et al. |
| 10,810,731 B2 | 10/2020 | Kozicki |
| 2003/0107105 A1 | 6/2003 | Kozicki |
| 2004/0124407 A1 | 7/2004 | Kozicki et al. |
| 2005/0225413 A1 | 10/2005 | Kozicki et al. |
| 2006/0238185 A1 | 10/2006 | Kozicki |
| 2006/0291364 A1 | 12/2006 | Kozicki |
| 2007/0285148 A1 | 12/2007 | Sakamoto et al. |
| 2008/0231418 A1 | 9/2008 | Ophey et al. |
| 2008/0296697 A1 | 12/2008 | Hsu et al. |
| 2010/0199104 A1 | 8/2010 | Van Rijnswou |
| 2011/0254141 A1 | 10/2011 | Roest et al. |
| 2012/0183135 A1 | 7/2012 | Paral et al. |
| 2013/0220413 A1 | 8/2013 | Kozicki et al. |
| 2015/0071432 A1 | 3/2015 | Zhu et al. |
| 2015/0194545 A1 | 7/2015 | Kozicki et al. |
| 2015/0195088 A1 | 7/2015 | Rostami et al. |
| 2015/0304115 A1 | 10/2015 | Kim et al. |
| 2017/0206383 A1 * | 7/2017 | Suwald .................... G06K 9/46 |
| 2018/0088059 A1 | 3/2018 | Kozicki |
| 2019/0197265 A1 | 6/2019 | Kozicki |
| 2019/0378638 A1 | 12/2019 | Liu et al. |
| 2020/0117882 A1 | 4/2020 | Kozicki |
| 2020/0272797 A1 | 8/2020 | Kozicki |
| 2020/0338556 A1 | 10/2020 | Kozicki et al. |
| 2021/0090649 A1 | 3/2021 | Kozicki et al. |
| 2021/0175185 A1 | 6/2021 | Kozicki et al. |

FOREIGN PATENT DOCUMENTS

| | | |
|---|---|---|
| WO | WO1997048032 A3 | 12/1997 |
| WO | WO1999028914 A2 | 6/1999 |
| WO | WO2000048196 A1 | 8/2000 |
| WO | WO2002021542 A1 | 3/2002 |
| WO | WO2002082452 A2 | 10/2002 |
| WO | WO2002099517 A2 | 12/2002 |
| WO | WO2003028098 A2 | 4/2003 |
| WO | WO2003032392 A2 | 4/2003 |
| WO | WO2003036735 A2 | 5/2003 |
| WO | WO2003058638 A1 | 7/2003 |
| WO | WO2003079463 A2 | 9/2003 |
| WO | WO2005083810 A2 | 9/2005 |
| WO | WO2005124788 A2 | 12/2005 |
| WO | WO2006043185 A1 | 4/2006 |
| WO | WO2008120128 A2 | 10/2009 |
| WO | WO2012065076 A1 | 5/2012 |
| WO | WO2018175973 A1 | 9/2018 |

OTHER PUBLICATIONS

Afghah et al., Concatenation of space-time block codes and LDPC codes. The 13th INTNSPS, 2008. 1-5.

Auguste, "La cryptographie militaire," Journal des sciences militaires, vol. 9, pp. 5-38, 1883 (statement of relevance included).

Berrou et al., Near Optimum Error Correcting Coding and Decoding: Turbo-Codes; IEEE Trans. on Communications 44, No. 10 (1996): 1261-1271.

Brier et al., "Correlation power analysis with a leakage model," in International Workshop on Cryptographic Hardware and Embedded Systems, 2004, pp. 16-29.

Cambou et al., Integrated Technology and policy Enabling Large-Scale Deployment of UAVs: Trustworthiness and Threat Mitigation; IEEE workshop on IoT security, Arlington, Feb. 2016.

Cambou et al., PUF designed with ReRAM and ternary states; CISR 2016, pp. 1-8.

Cao et al., CMOS image based PUF for coherent sensor-level authentication; IEEE trans. on circuits and systems, vol. 62, issue 11, pp. 2629-2640. 2015.

Casini, Understanding Machine Learning effectiveness to protect WEB authentication, Venezia: Universita Ca Foscari, 2014.

Chen et al., "Exploiting resistive cross-point array for compact design of physical unclonable function," in IEEE International Symposium on Hardware Oriented Security and Trust—HOST, 2015, pp. 26-31.

Chen, W. et al., "Volatile and Non-Volatile Switching in Cu—SiO2 Programmable Metallization Cells", IEEE Electron Device Letters, May 2016 [IEEE Date of Publication: Mar. 2016], vol. 37, No. 5, pp. 580-583 <DOI:10.1109/LED.2016.2540361>.

Choi et al., "Data clustering using memristor networks," Scientific Reports, 5:10492, 2015.

Cortez et al., "Modeling SRAM start-up behavior for physical unclonable functions," in 2012 IEEE International Symposium on Defect and Fault Tolerance in VLSI and Nanotechnology Systems (DFT), 2012, pp. 1-6.

(56) References Cited

OTHER PUBLICATIONS

Coteus et al., "Technologies for exascale systems," IBM Journal of Research and Development, 55(5):14, 2011.

Damiani et al., "New paradigms for access control in open environments," in Proceedings of the 5th IEEE International Symposium on Signal Processing and Information Technology, 2005, pp. 540-545.

Defense Advanced Research Projects Agency (DARPA), "Supply Chain Hardware Integrity for Electronics Defense (SHIELD)," <https://www.darpa.mil/program/supply-chain-hardware-integrity-for-electronics-defense> publicly available at least as early as Jul. 2015.

Devadas et al., "Design and implementation of PUF-based 'unclonable' RFID ICs for anti-counterfeiting and security applications," in IEEE International conference on RFID, 2008, pp. 58-64.

Falk et al., New Directions in Applying Physical Unclonable Functions; SECUWARE 2015.

Fei et al., "A statistical model for DPA with novel algorithmic confusion analysis," in International Workshop on Cryptographic Hardware and Embedded Systems, 2012, pp. 233-250.

Fei et al., "A statistics-based fundamental model for side-channel attack analysis." IACR Cryptology ePrint Archive, vol. 2014, p. 152, 2014.

Gao et al., "Memristive crypto primitive for building highly secure physical unclonable functions," Scientific Reports, 5:12785, 2015.

Gao et al., "mrPUF: A novel memristive device based physical unclonable function," in Applied Cryptography and Network Security, 2015, pp. 595-615.

Gao et al., Exploiting Unreliability of the PUF to Secure Remote Wireless Sensing; Int. association for cryptologic research, 2015:1240, 2015.

Gao, L. et al., "Physical Unclonable Function Exploiting Sneak Paths in Resistive Cross-point Array", IEEE Transactions on Electron Devices, Aug. 2016 [IEEE date of publication: Jun. 2016], vol. 63, No. 8, pp. 3109-3115 <DOI:10.1109/TED.2016.2578720>.

Gassend et al., "Identification and authentication of integrated circuits," Concurrency and Computation: Practice and Experience, vol. 16, No. 11, pp. 1077-1098, 2004.

Gassend; Physical random functions; M.S. thesis, Dept. Electr. Eng. Comput. Sci., MA, USA, Massachusetts Inst. Technol., Cambridge, 2003.

Gilbert et al. "A 0.6 V 8 pJ/write Non-Volatile CBRAM Macro Embedded in a Body Sensor Node for Ultra Low Energy Applications." VLSI Circuits (VLSIC), 2013 Symposium on. IEEE, 2013.

Guajardo et al., "Brand and IP protection with physical unclonable functions," in IEEE International Symposium on Circuits and Systems (ISCAS), 2008, pp. 3186-3189.

Guajardo et al., "FPGA intrinsic PUFs and their use for IP protection," in International workshop on Cryptographic Hardware and Embedded Systems, 2007, pp. 63-80.

Guajardo et al., Physical Unclonable Functions and Public Key Crypto for FPGA IP Protection. In: International Conference on Field Programmable Logic and Applications—FPL 2007, Aug. 27-30, 2007, pp. 189-195. IEEE, Los Alamitos (2007).

Helfmeier et al., "Cloning physically unclonable functions," in IEEE International Symposium on Hardware-Oriented Security and Trust—HOST, 2013, pp. 1-6.

Helfmeier et al.; Physical Vulnerabilities of PUFs; Proceedings of the conference on Design, Automation & Test (DARE'14). Belgium, 2014.

Herder et al., "Physical Unclonable Functions: A Tutorial," Proc. IEEE, vol. 102 (2014) 1126-1141.

Hofer et al., Error correction coding for physical unclonable functions. In: Austrochip, Workshop on Microelectronics, 2010.

Holcomb et al., "Initial SRAM state as a fingerprint and source of true random Numbers for RFID tags," in Proceedings of the Conference on RFID Security, vol. 7, 2007.

Hori et al., "Quantitative and statistical performance evaluation of arbiter physical unclonable functions on FPGAs," in IEEE International Conference on Reconfigurable Computing and FPGAs (ReConFig), 2010, pp. 298-303.

Hu et al., "Physically unclonable cryptographic primitives using self-assembled carbon nanotubes," Nature Nanotechnology, vol. 11, No. 6, pp. 559-565, 2016.

Hvarinen et al., Independent Component Analysis, algorithms, and applications; Neural Networks, vol. 13, 411-430, 2000.

International Preliminary Report on Patentability for Application No. PCT/US2018/024156 dated Oct. 3, 2019 (14 pages).

International Search Report and Written Opinion for Application No. PCT/US2018/024156 dated Jul. 13, 2018 (16 pages).

Joseph et al., "Machine Learning Methods for computer security," Dagstuhl Perspective Workshop 12371, 2012.

Kaganov, "Machine Learning Methods in Authentication Problems using Password Keystroke dynamics," Computational Mathematics and Modeling, vol. 26, No. 3, pp. 398-407, 2015.

Katzenbeisser et al.; PUFs: Myth, Fact or Busted? A Security Evaluation of Physically Unclonable Functions Cast in Silicon; CHES, 2012, pp. 283-301.

Kim et al., "A Physical Unclonable Function with Redox-based Nanoionic Resistive Memory," arXiv:1611.04665v1 [cs.ET], (2016).

Kinget, "Device mismatch and tradeoffs in the design of analog circuits," IEEE Journal of Solid-State Circuits, vol. 40, No. 6, pp. 1212-1224, 2005.

Kobayashi et al., "A current-mode latch sense amplifier and a static power saving input buffer for low-power architecture," in Symposium on VLSI Circuits, 1992, pp. 28-29.

Kocher et al., "Introduction to differential power analysis," Journal of Cryptographic Engineering, vol. 1, No. 1, pp. 5-27, 2011.

Koeberl et al., "Memristor PDFs: a new generation of memory-based physically unclonable functions," in Proceedings of the Conference on Design, Automation and Test in Europe, 2013, pp. 428-431.

Konstantinou et al., "Cyber-physical systems: A security perspective," in 20th IEEE European Test Symposium (ETS), 2015, pp. 1-8.

Kozicki et al., "Mass transport in chalcogenide electrolyte films—materials and applications," J. of Non-Crystalline Solids, vol. 352, pp. 567-577, Mar. 2006.

Kozicki et al., "Nonvolatile memory based on solid electrolytes," in Proc. IEEE Non-Volatile Memory Technol. Symp., pp. 10-17, 2004.

Kozicki et al., "Nanoscale memory elements based on solid-state electrolytes," IEEE Trans. Nanotechnol, vol. 4, pp. 331-338, May 2005.

Kozicki et al., "Programmable metallization cell memory based on Ag—Ge—S and Cu—Ge—S solid electrolytes," Proc. NVMTS, p. 83-89, 2005.

Kumar et al., "The butterfly PUF protecting IP on every FPGA," in IEEE International Workshop on Hardware-Oriented Security and Trust-HOST, 2008, pp. 67-70.

Legenstein, "Computer science: Nanoscale connections for brain-like circuits," Nature, vol. 521, No. 7550, pp. 37-38, 2015.

Lim et al., "Extracting secret keys from integrated circuits," IEEE Transactions on Very Large Scale Integration (VLSI) Systems, vol. 13, No. 10, pp. 1200-1205, 2005.

Llyod, Least Squares Quantization in PCM; IEEE Transactions on Information Theory 18, No. 2 (1982).

Luo et al., "Algorithmic collision analysis for evaluating cryptographic systems and side-channel attacks," in IEEE International Symposium on Hardware-Oriented Security and Trust (HOST), 2011, pp. 75-80.

Maes et al., A Soft Decision Helper Data Algorithm for SRAM PUFs; 2016 IEEE International Symposium on Information Theory. 2009.

Maes, "Physically unclonable functions: Constructions, properties and applications," Ph.D. dissertation, Ph. D. thesis, Dissertation, University of KU Leuven, 2012.

Maiti et al., "A robust physical unclonable function with enhanced challenge-response set," IEEE Transactions on Information Forensics and Security, vol. 7, No. 1, pp. 333-345, 2012.

(56) References Cited

OTHER PUBLICATIONS

Majzoobi et al., "Slender PUF protocol: A lightweight, robust, and secure authentication by substring matching," in IEEE Symposium on Security and Privacy Workshops—SPW, 2012, pp. 33-44.

Majzoobi et al., "Techniques for design and implementation of secure reconfigurable PUFs," ACM Transactions on Reconfigurable Technology and Systems (TRETS), vol. 2, No. 1, p. 5:1-5:33, 2009.

Majzoobi et al., "Testing techniques for hardware security," in IEEE International Test Conference (ITC), 2008, pp. 1-10.

Messerges et al., "Examining smart-card security under the threat of power analysis attacks," IEEE Transactions on Computers, vol. 51, No. 5, pp. 541-552, 2002.

Mickel et al., "A physical model of switching dynamics in tantalum oxide memristive devices," Appl. Phys. Lett., vol. 102, p. 223502, 2013.

Nandakumar, S. et al., "Physics-based switching model for Cu/SiO2/W quantum memristor", 2016 74th Annual Device Research Conference (DRC) (Jun. 19-22, 2016, Newark, DE, USA), Date Added to IEEE Xplore: Aug. 2016, 2 pages <DOI:10.1109/DRC.2016.7548509>.

National Public Radio, "Internet of Things' Hacking Attack Led to Widespread Outage of Popular Websites," <http://www.npr.org/2016/10/22/498954197/internet-outage-update-internet-of-things-hacking-attack-led-to-outage-of-popula>, dated Oct. 22, 106.

Nili et al., "Donor-induced performance tuning of amorphous SrTiO3 memristive nanodevices: Multistate resistive switching and mechanical tunability," Advanced Functional Materials, vol. 25, No. 21, pp. 3172-3182, 2015.

Nili et al., "Nanoscale resistive switching in amorphous perovskite oxide (a-SrTiO3) memristors," Advanced Functional Materials, vol. 24, No. 43, pp. 6741-6750, 2014.

Nili, H. et al., "Highly-Secure Physically Unclonable Cryptographic Primitives Using Nonlinear Conductance and Analog State Tuning in Memristive Crossbar Arrays", arXiv, Submitted Nov. 23, 2016, 25 pages, arXiv: 1611.07946v1.

Oren et al., "On the effectiveness of the remanence decay side-channel to clone memory-based PUFs," in International Workshop on Cryptographic Hardware and Embedded Systems, 2013, pp. 107-125.

Pelgrom et al., "Matching properties of MOS transistors," IEEE Journal of solid-state circuits, vol. 24, No. 5, pp. 1433-1439, 1989.

Prabhu et al., Extracting Device Fingerprints from Flash Memory by Exploiting Physical Variations; 4th int. conf, on Trust and trustworthy computing; Jun. 2011.

Prezioso et al., "Training and operation of an integrated neuromorphic network based on metal-oxide memristors," Nature, vol. 521, No. 7550, pp. 61-64, 2015.

Price et al., How to Generate Repeatable Keys Using PUF, Correcting PUF Errors with Iteratively Broadening and Prioritized Search; International Association for Cryptologic Research, CHES 2014.

Puthentheradam, S. et al., "Inherent diode isolation in programmable metallization cell resistive memory elements", Applied Physics A, Jan. 2011, vol. 102, pp. 817-826 <DOI:10.1007/s00339-011-6292-5>.

Rajendran et al., "Nano meets security: Exploring nanoelectronic devices for security applications," Proceedings of the IEEE, vol. 103, No. 5, pp. 829-849, 2015.

Rajendran et al., "Nano-PPUF: A memristor-based security primitive," in IEEE Computer Society Annual Symposium on VLSI (ISVLSI), 2012, pp. 84-87.

Ranasinghe et al., "Confronting security and privacy threats in modern RFID systems," in Fortieth Asilomar Conference on Signals, Systems and Computers (ACSSC), 2006, pp. 2058-2064.

Razavi, "The StrongARM latch: A circuit for all seasons," IEEE Solid-State Circuits Magazine, vol. 7, No. 2, pp. 12-17, 2015.

Razi et al., Space-Time Block Codes Assisted by Fast Turbo Codes; WiCOM '08. 2008. 1-6.

Razi et al.; Binary Source Estimation Using a Two-Tiered Wireless Sensor Network; Communications Letters, IEEE 15, No. 4 (2011): 449-451.

Rose et al., "A write-time based memristive PUF for hardware security applications," in IEEE/ACM International Conference on Computer-Aided Design (ICCAD), 2013, pp. 830-833.

Rosenfeld et al., Sensor Physical Unclonable Functions; IEEE HOST, pp. 112-117, 2010.

Rostami et al., "Robust and reverse-engineering resilient PUF authentication and key-exchange by substring matching," IEEE Transactions on Emerging Topics in Computing, vol. 2, No. 1, pp. 37-49, 2014.

Rueppel, "Correlation immunity and the summation generator," in Advances in Cryptology—CRYPTO'85 Proceedings, 1985, pp. 260-272.

Rührmair et al., "Applications of high-capacity crossbar memories in cryptography," IEEE Transactions on Nanotechnology, vol. 10, No. 3, pp. 489-498, 2011.

Rührmair et al., "Modeling attacks on physical unclonable functions," in Proceedings of the 17th ACM Conference on Computerand Communications Security, 2010, pp. 237-249.

Rührmair et al., "PUF modeling attacks on simulated and silicon data," IEEE Transactions on Information Forensics and Security, vol. 8, No. 11, pp. 1876-1891, 2013.

Rührmair et al., "Strong PUFs: models, constructions, and security proofs," in Towards Hardware—Intrinsic Security. Springer, 2010, pp. 79-96.

Škorić et al., "Robust key extraction from physical uncloneable functions," in Applied Cryptography and Network Security, 2005, pp. 407-422.

Strukov, "Endurance-write speed tradeoffs in nonvolatile memories," Applied Physics A, vol. 122, No. 4, pp. 1-4, 2016.

Su et al., "A digital 1.6 pJ/bit chip identification circuit using process variations," IEEE Journal of Solid-State Circuits, vol. 43, No. 1, pp. 69-77, 2008.

Suh et al., "Physical unclonable functions for device authentication and secret key generation," in Proceedings of the 44th annual Design Automation Conference, 2007, pp. 9-14.

Tajik et al., "Physical characterization of arbiter PUFs," in International Workshop on Cryptographic Hardware and Embedded Systems, 2014, pp. 493-509.

Tsunoda et al., "Low power and high speed switching of Ti-doped NiO ReRAM under the unipolar voltage source of less than 3 V," in IEEE International Electron Devices Meeting (IEDM), 2007, pp. 767-770.

U.S. Appl. No. 17/025,523, filed Sep. 18, 2020, Kozicki.

U.S. Appl. No. 17/112,668, filed Dec. 4, 2020, Kozicki.

Valov et al., "Electrochemical metallization memories—Fundamentals, applications, prospects," Nanotechnology, vol. 22, p. 254003, 2011.

Valov et al., "Nanobatteries in redox-based resistive switches require extension of memristor theory," Nature Communications, vol. 4, p. 1771, 2013.

Van der Leest et al., "Anti-counterfeiting with hardware intrinsic security," in IEEE Design, Automation & Test in Europe Conference & Exhibition (DATE), 2013, pp. 1137-1142.

Vatajelu et al., STT-MRAM-Based PUF Architecture exploiting Magnetic Tunnel Junction Fabrication-Induced Variability; ACM J. Emerging Tech, in Comp Sys.; 13(1):5, May 2016.

Waser et al., "Nanoionics-based resistive switching memories," Nature Materials, vol. 6, No. 11, pp. 833-840, 2007.

Waser et al., "Redox-based resistive switching memories—nanoionic mechanisms, prospects, and challenges," Advanced materials, vol. 21, No. 25-26, pp. 2632-2663, 2009.

Webster et al., "On the design of S-boxes," in Advances in Cryptology—CRYPTO'85 Proceedings, 1985, pp. 523-534.

Willers et al., MEMS-based gyroscope as PUFs; CCS'16, Oct. 24-28, 2016, pp. 591-602.

Wong et al., "Memory leads the way to better computing," Nature Nanotechnology, vol. 10, No. 3, pp. 191-194, 2015.

Yang et al., Adaptive Quantization Using Piecewise Companding and Scaling for Gaussian Mixture; Visual Communication and Image Representation. 2012.

(56) References Cited

OTHER PUBLICATIONS

Yang, Y. et al., "Novel Complementary Resistive Switch Crossbar Memory Write and Read Schemes", IEEE Transactions on Nanotechnology, Mar. 2015 [IEEE Date of Publication: Jan. 2015], vol. 14, No. 2, pp. 346-357 <DOI:10.1109/TNANO.2015.2394450>.
Yu et al., "Secure and robust error correction for physical unclonable functions," IEEE Design Test of Computers, vol. 27, No. 1, pp. 48-65, 2010.
Zhang et al., "A PUF-FSM binding scheme for FPGA IP protection and pay-per-device licensing," IEEE Transactions on Information Forensics and Security, vol. 10, No. 6, pp. 1137-1150, 2015.
Zhang et al., "Exploiting process variations and programming sensitivity of phase change memory for reconfigurable physical unclonable functions," IEEE Transactions on Information Forensics and Security, vol. 9, No. 6, pp. 921-932, 2014.
Zhang et al., "Optimizating emerging nonvolatile memories for dual-mode applications: Data storage and key generator," IEEE Transactions on Computer-Aided Design of Integrated Circuits and Systems, vol. 34, No. 7, pp. 1176-1187, 2015.
Zhang et al.,, "Highly reliable spin-transfer torque magnetic ram-based physical unclonable function with multi-response-bits per cell," IEEE Transactions on Information Forensics and Security, vol. 10, No. 8, pp. 1630-1642, 2015.
Abtew, M. Zhang, and D. A. Drabold, "Ab initio estimate of temperature dependence of electrical conductivity in a model amorphous material: Hydrogenated amorphous silicon," Phys. Rev. B 76, 045212 (2007).
Alajerami, K. Cimatu, G. Chen and D. A. Drabold, Radiation shielding properties of Bismuth Borate glasses doped with Cadmium Oxide, Ceramics International 46 12718 (2020).
Allen and J. Q. Broughton, "Electrical Conductivity and Electronic Properties of Liquid Silicon," J. Phys.Chem. 91, 4964 (1987).
Balakrishnan, S. C. P. Thermadam, M. Mitkova, and M. N. Kozicki, "A Low Power Non-Volatile Memory Element Based on Copper in Deposited Silicon Oxide," in 2006 7th Annual Non-Volatile Memory Technology Symposium, 2006, pp. 104-110.
Baranger et al., Electrical linear-response theory in an arbitrary magnetic field: A new Fermi-surface formation, Phys. Rev. B 40, 8169 (1989).
Barranco, F. Yubero, J. P. Espinos, P. Groening, A. R. Gonzalez-Elipe, Electronic state characterization of SiOx thin films prepared by evaporation, J. Appl. Phys. 97, 113714 (2005).
Barranco, J. A. Mejias, J. P. Espinos, A. Caballero, A. R. Gonzalez-Elipe, F. Yubero, Chemical stability of Si+n species in SiOx (x<2) thin films, J. Vac. Sci. Technol. A 19(1) Jan./Feb. 2001.
Barranco, J. Cotrino, F. Yubero, J. P. Espinos, A. R. Gonzalez-Elipe, Room temperature synthesis of porous SiO2 thin-films by plasma enhan.ced chemical vapor deposition, J. Vac. Sci. Technol. A (4), Jul./Aug. 2004.
Bartók, J Kermode, N Bernstein, G Csányi, Machine learning a general-purpose interatomic potential for silicon, Phys. Rev. X 8 041048 (2018).
Belandi et al., SiO2 Etch Rate Modification by Ion Implantation, Solid State Phenomena, vol. 195, pp. 55-57, Dec. 2012.
Bernard, V. T. Renard, P. Gonon, and V. Jousseaume, "Back-end-of-line compatible Conductive Bridging RAM based on Cu and SiO2," Microelectron. Eng., vol. 88, No. 5, pp. 814-816, 2011.
Bernstein, B. Bhattarai, G. Csányi, D. A. Drabold, S. R. Elliott, V. L. Deringer, Quantifying Chemical Structure and Atomic Energies in Amorphous Silicon Networks, Angewandte Chemie 58 7057 (2019).
Bhattarai and D. A. Drabold, Vibrations in amorphous silica, J. Non. Cryst. Sol. 439 6 (2016).
Bhattarai, A. Pandey and D. A. Drabold, Evolution of amorphous carbon across densities, an inferential study, Carbon 131 168 (2018).
Bhattarai, P. Biswas, R. Atta-Fynn and D. A. Drabold, Amorphous graphene: a constituent part of low density amorphous carbon, Phys. Chem. Chem. Phys. 20 19546 (2018).
Bhattarai, R. Thapa and D. A. Drabold, Ab initio inversion of structure and the lattice dynamics of a metallic glass: the case of Pd40Ni40P20, Modeling and Simulation in Materials Science and Engineering 27 075002 (2019).
Binnig, H. Rohrer, Ch. Gerber, and E. Weibel, 7×7 Reconstruction on Si(111) Resolved in Real Space, Phys. Rev. Lett. 50 120 (1983).
Boyd and J. I. B. Wilson, A study on thin silicon dioxide films using infrared absorption techniques, J. App. Phys. 53 (6), pp. 4166-4171, Jun. 1982.
Cambou, F. Afghah, D. Sonderegger, J. Taggart, H. Barnaby, M. N. Kozicki, Ag conductive bridge RAMs for physical unclonable functions, Proceeding of the IEEE Host Conference, 2017, vol. 1, pp. 151-151.
Carboni and D. Ielmini (2019) Stochastic Memory Devices for Security and Computing, Adv. Electron. Mater. 2019, pp. 1900198, DOI: 10.1002/aelm.201900198.
Chen et al., "Total-Ionizing-Dose Effects on Resistance Stability of Programmable Metallization Cell Based Memory and Selectors," IEEE Trans. Nucl. Sci., vol. 64, No. 1, pp. 269-276, 2017.
Chen, J. Wu, Q. Zhang and X. Su, Recent advancement of SiOx based anodes for lithium-ion batteries, J. Power Sources 363, 126 (2017).
Chen, S. Tappertzhofen, H. Barnaby, M. N. Kozicki, SiO2 based conductive bridging random access memory, J Electroceram (2017) 39:109-131.
College Transitions, "Top Honors Programs," <https://www.collegetransitions.com/dataverse/top-honors-programs> publicly available at least as early as Oct. 16, 2019.
De Los Santos Valladares et al., "Crystallization and electrical resistivity of Cu2O and CuO obtained by thermal oxidation of Cu thin films on SiO2/Si substrates," Thin Solid Films, vol. 520, No. 20, pp. 6368-6374, 2012.
Dearnaley, A. Stoneham, D. Morgan, Electrical phenomena in amorphous oxide films. Rep. Prog. Phys. 33, 1129 (1970).
Deringer, N. Bernstein, G. Csanyi, M. Wilson, D. A. Drabold and S. R. Elliott, Structural transitions in dense disordered silicon from quantum-accurate ultra-large-scale simulations, Submitted to Nature Dec. 2019.
Dong and D. A. Drabold, Atomistic structure of band tail states in amorphous silicon, Phys. Rev. Lett. 80 1928 (1998).
Dong and D. A. Drabold, Ring formation and the structural and electronic properties of tetrahedral amorphous carbon surfaces, Phys. Rev. B 57 15591 (1998).
Drabold, "David Drabold Distinguished Professor of Physics," Ohio University, <https://daviddrabold.com/people/> publicly available at least as early as Feb. 9, 2019.
Drabold, Topics in the theory of amorphous materials, European Physical Journal B 68 1 (2009).
Economou and C. M. Soukoulis, Static Conductance and Scaling Theory of Localization in One Dimension, Phys. Rev. Lett. 46, 618 (1981).
Galli, R. M. Martin, R. Car, and M. Parrinello, "Ab initio calculation of properties of carbon in the amorphous and liquid states," Phys. Rev. B 42,7470 (1990).
Gao, S. F. Al-Sarawi, D. Abbott, Physical unclonable functions. Nat Electron 3, 81-91 (2020).
Garcia-Valenzuela, R. Alvarez, J.-P. Espinos, V. Rico, J. Gil-Rostra, A. Palmero, A. R. Gonzalez-Elipe, SiOx by magnetron sputtered revisited: Tailoring the photonic properties of multilayers, Appl. Surf. Sciences 488, pp. 791-800, (2019).
Ghijsen et al., "Electronic structure of Cu2O and CuO," Phys. Rev. B, vol. 38, No. 16, pp. 11322-11330, 1988.
Gopalan et al., "Demonstration of Conductive Bridging Random Access Memory (CBRAM) in logic CMOS process," Solid. State. Electron., vol. 58, No. 1, pp. 54-61, 2011.
Gopalan, M. N. Kozicki, S. Bhagat, S. C. Puthen Thermadam, T. L. Alford, and M. Mitkova, "Structure of copper-doped tungsten oxide films for solid-state memory," J. Non. Cryst. Solids, vol. 353, No. 18-21, pp. 1844-1848, 2007.
Grassini, M. Ishtaiwi, M. Parvis, L. Benussi, S. Bianco, S. Colafranceschi, D. Piccolo, SiOx coated plastic fiber optic sensor for gas monitoring in RPC, Proceeding of Science, (RPC2012)072.

(56) References Cited

OTHER PUBLICATIONS

Han and M. Tao, "Electrochemically deposited p-n homojunction cuprous oxide solar cells," Sol. Energy Mater. Sol. Cells, vol. 93, No. 1, pp. 153-157, 2009.
Herasimenka, W. J. Dauksher, M. Boccard, S. Bowden, ITO/SiOx:H stacks for silicon heterojunction solar cells, Solar Energy Materials & Solar Cells158 (2016) pp. 98-101.
Hernandez, P. Miska, M. Grun, S. Estrade, F. Peiro, B. Garrido, M. Vergant, P. Pellegrino, Tailoring the Surface density of silicon nanocrystals embedded in SiOx single layers, J. Appl. Phys. 114, 233101 (2013).
Igram, B. Bhattarai, P. Biswas and D. A. Drabold, Large and realistic models of amorphous silicon, J. Non-Cryst. Sol 492 27 (2018).
Igram, H. Castillo and D. A. Drabold, Structure and dynamics of an Ag-doped chalcogenide glass, an ab initio study, J. Non-Cryst. Sol. 514 1 (2019).
Inam and D. A. Drabold, Theoretical study of an amorphous chalcogenide surface. J. Non-Cryst. Sol. 354 2495 (2008).
Jayatissa, K. Guo, and A. C. Jayasuriya, "Fabrication of cuprous and cupric oxide thin films by heat treatment," Appl. Surf. Sci., vol. 255, No. 23, pp. 9474-9479, 2009.
Je, J. Kim, J. C. Harrison, M. N. Kozicki, and J. Chae, "In situ tuning of omnidirectional microelectromechanical-systems microphones to improve performance fit in hearing aids," Appl. Phys. Lett., vol. 93, No. 12, pp. 1-4, 2008.
Kang, B. Arnold, C. J. Summers, B. K. Wagner, Synthesis of silicon quantum dot buried SiOx films with controlled luminescent properties for solid-state lighting, Nanotechnology 17 (2006) pp. 4477-4482.
Kilian, D. A. Drabold and J. B. Adams, First principles simulations of a-Si and a-Si:H surfaces, Phys. Rev. B 48 17393 (1993).
Klingsporn, S. Kirner, C. Villringer, D. Abou-Ras, I. Costina, M. Lehmann, and B. Stannowski, Resolving the nanostructure of plasma-enhanced chemical vapor deposited nanocrystalline SiOx layers for application in solar cells, J. Appl. Phys. 119, 223104 (2016).
Koffyberg and F. A. Benko, "A photoelectrochemical determination of the position of the conduction and valence band edges of p-type CuO," J. Appl. Phys., vol. 53, No. 2, pp. 1173-1177, 1982.
Kozicki and H. J. Barnaby, "Conductive bridging random access memory—Materials, devices and applications," Semicond. Sci. Technol., vol. 31, No. 11, 2016.
Kozicki, C. Gopalan, M. Balakrishnan, and M. Mitkova, "A low-power nonvolatile switching element based on copper-tungsten oxide solid electrolyte," IEEE Trans. Nanotechnol., vol. 5, No. 5, pp. 535-544, 2006.
Kozicki, M. Mitkova, M. Park, M. Balakrishnan, and C. Gopalan, "Information storage using nanoscale electrodeposition of metal in solid electrolytes," Superlattices Microstruct., vol. 34, No. 3-6, pp. 459-465, 2003.
Kozicki, P. Maroufkhani, and M. Mitkova, "Valving in microchannels via electrodeposition on solid electrolytes," vol. 1, no. January, pp. 716-721, 2005.
Kozicki, Y. Gonzalez-Velo, A. Patadia, P. Apsangi, H. J. Barnaby, J. Allgair, B. Attaway, J. Callahan, S. Follis, J. Morris, S. Shive, A. Velaga, Copper-Silicon oxide resistive memory: A versatile back-end-of-line technology, invited presentation, Memrisys 2019, Dresden, Jul. 8-11.
Kresse et al., "Efficiency of ab-initio total energy calculations for metals and semiconductors using a plane-wave basis set," Comput. Mater. Sci. 6:15-50 (1996).
Kresse et al., "Efficient iterative schemes for ab initio total-energy calculations using a planewave basis set," Phys. Rev. B 54(16):11169-11186 (1996).
Kuzmin, A. Anspoks, A. Kalinko, J. Timoshenko, and R. Kalendarev, "X-ray absorption spectroscopy of Cu-doped WO3 films for use in electrochemical metallization cell memory," J. Non. Cryst. Solids, vol. 401, pp. 87-91, 2014.

Kwon et al., "Nanoscale CuO solid-electrolyte-based conductive-bridging-random-access-memory cell operating multi-level-cell and 1selector1resistor," J. Mater. Chem. C, vol. 3, No. 37, pp. 9540-9550, 2015.
Lucovsky, J. Manitini, Low temperature growth of silicon dioxide films: A study of chemical bonding by ellipsometry and infra-red spectroscopy, J. Vac. Sci. Technol. B 5 (2) Mar./Apr. 1987.
Ludlam, S. N. Taraskin, S. R. Elliott and D. A. Drabold, Universal features of eigenstates in disordered systems, J. Phys. Cond. Matter 17 L321 (2005).
Mannion, A. Mehonic, W. H. Ng, A. J. Kenyon, Memristor-Based Edge Detection for Spike Encoded Pixels, Front. Neurosci. 13:1386, 2020.
Mehonic, A. J. Kenyon, Emulating the Electrical Activity of the Neuron Using a Silicon Oxide RRAM Cell, Front.Neurosci.10:57, 2016.
Mehonic, A. L. Shluger, D. Gao, I. Valov, E. Miranda, D. Ielmini, A. Bricalli, E. Ambrosi, C. Li, J. J. Yang, Q. Xia, A. J. Kenyon, Silicon Oxide (SiOx): A Promising Material for Resistance Switching?, Adv. Mater. 2018, 30, 1801187.
Mehonic, M. Buckwell, L. Montesi, L. Garnett, S. Hudziak, S. Fearn, R. Chater, D. McPhail, A. J. Kenyon, Structural changes and conductance thresholds in metal-free intrinsic SiOx resistive random access memory, J. Appl. Phys. 117, 124505 (2015).
Mehonic, M. Buckwell, L. Montesi, M. S. Munde, D. Gao, S. Hudziak, R. J. Chater, S. Fearn, D. McPhail, M. Bosman, A. L. Shluger, A. J. Kenyon, Nanoscale Transformations in Metastable, Amorphous, Silicon-Rich Silica Adv. Mater. 2016, 28, 7486-7493.
Mehonic, M.S. Munde, W.H. Ng, M. Buckwell, L. Montesi, M. Bosman, A.L. Shluger, A.J. Kenyon, Intrinsic resistance switching in amorphous silicon oxide for high performance SiOx ReRAM devices, Microelectronic Engineering, 178, 2017, pp. 98-103, (2017).
Mehonic, S. Cueff, M. Wojdak, S. Hudziak, C. Labbe, R. Rizk, A. J Kenyon, Electrically tailored resistance switching in silicon oxide, Nanotechnology 23 (2012) 455201 (9pp).
Mehonic, S. Cueff, M. Wojdak, S. Hudziak, O. Jambois, C. Labbé, B. Garrido, R. Rizk, A. J. Kenyon, Resistive switching in silicon suboxide films, J. Appl. Phys. 111, 074507 (2012).
Mitkova and M. N. Kozicki, "Silver incorporation in Ge—Se glasses used in programmable metallization cell devices," J. Non. Cryst. Solids, vol. 299-302, No. PART 2, pp. 1023-1027, 2002.
Moore, "Moore's Law ,Electronics," vol. 38, No. 8, p. 114, 1965.
Munde, A. Mehonic, W. H. Ng , M. Buckwell, L. Montesi, M. Bosman, A. L. Shluger, A. J. Kenyon, Intrinsic Resistance Switching in Amorphous Silicon Suboxides: The Role of Columnar Microstructure, Scientific Reports 7: 9274, 2017.
Murarka, "Multilevel interconnections for ULSI and GSI era," Mater. Sci. Eng. R Reports, vol. 19, No. 3-4, pp. 87-151, 1997.
National Science Foundation "Award No. 1507670," <https://www.nsf.gov/awardsearch/showAward?AWD_ID=1507670> publicly available at least as early as Jun. 28, 2017.
National Science Foundation, "Award No. 1506836," <https://www.nsf.gov/awardsearch/showAward?AWD_ID=1506836> publicly available at least as early as Jun. 28, 2017.
Nesheva, C. Raptis, A. Perakis, I. Beneva, Z. Aneva, Z. Levi, S. Alexandrova, H. Hofmeister, Raman scattering and photoluminescence from Si nanoparticles in annealed SiOx thin films, J. Appl. Phys., vol. 92, No. 8, pp. 4678-4683 (2002).
Nessel, R. Q. Lee, C. H. Mueller, M. N. Kozicki, M. Ren, and J. Morse, "A novel nanoionics-based switch for microwave applications," IEEE MTT-S Int. Microw. Symp. Dig., pp. 1050-1054, 2008.
Nosé (1984). A unified formulation of the constant temperature molecular-dynamics methods. Journal of Chemical Physics. 81 511-519 (1984).
Novikov, V. A. Gritsenko, Short-range order in amorphous SiOx by x-ray photoelectron spectroscopy, J. Appl. Phys. 110, 014107 (2011).
NPR Weekend Edition Saturday (2016). 'Internet of Things' Hacking Attack Led to Widespread Outage of Popular Websites, National Public Radio, http://www.npr.org/2016/10/22/498954197/internet-outage-update-internet-of-things-hacking-attack-led-to-outage-of-popula.

(56) References Cited

OTHER PUBLICATIONS

O'Leary, J. H. Thomas, Characterization of reactively evaporated SiOx thin films, Journal of Vacuum Science & Technology A 5, 106 (1987).
Oakeshott and A. MacKinnon, Numerical evaluation of current paths in disordered media, J. Phys.: Condens. Matter 6, 1513 (1994).
Ohio University, "Honors Tutorial College," <https://www.ohio.edu/honors> publicly available at least as early as Apr. 3, 2017.
Ori, C. Massobrio, A. Bouzid, B. Coasn, Surface of glassy GeS2: a model based on a first principles approach, Phys. Rev. B 90 045423 (2014).
Oxford Instruments, "Basic PECVD Plasma Processes," <https://nanolab.berkeley.edu/process_manual/chap6/6.20PECVD.pdf> dated 2003.
Oxley, Electroforming, switching and memory effects in oxide thin films. Act. Passive Electron. Compon. 3, 217, 1977.
P. B. Allen, "Electron Transport" in Contemporary Concepts of Condensed Matter Science, Conceptual Foundations of Materials: A Standard Model for Ground- and Excited-State Properties (2006).
Pai, S. S. Chao, Y. Takagi, G. Lucovsky, Infrared spectroscopic study of SiOx films produced by plasma enhanced chemical vapor deposition, J. Vac. Sci. Technol. A 4 (3) May/Jun. 1986.
Pandey, N. Podraza and D. A. Drabold, Electrical activity of boron and phosphorous in hydrogenated amorphous silicon, Phys. Rev. Applied 2 054005 (2014).
Pandey, P. Biswas and D. A. Drabold, Inversion of diffraction data for amorphous materials, Scientific Reports, 6 33731 (2016).
Pandey, P. Biswas and D. A. Drabold, Realistic inversion of diffraction data for an amorphous solid: the case of silicon, Phys. Rev B 94 235208 (2016).
Pandey, P. Biswas and D. A. Drabold, Force enhanced atomic refinement: application to amorphous silica and amorphous silicon, Phys. Rev. B 92 155205 (2015).
Papiora, N. Lorente, T. Frederiksen, A. Garcia, M. Brandbyge, Improvements on non-equilibrium and transport Green function techniques: The next-generation transiesta, Comp. Phys. Comm. 212, 8-24 (2017).
Park, K.S. Kim, M.H. Jung, WJ Cho and J. Jung, Electrical Characteristics of SiO2/High-k Dielectric Stacked Tunnel Barriers for Nonvolatile Memory Applications. Journal of The Korean Physical Society vol. 55. 10.3938/jkps.55.116 (2009).
Pearton, W. H. Heo, M. Ivill, D. P. Norton, and T. Steiner, "Dilute magnetic semiconducting oxides," Semicond. Sci. Technol., vol. 19, No. 10, pp. R59-R74, 2004.
Perdew, K. Burke, and M. Ernzerhof, Phys. Rev. Lett. 77, 3865 (1996).
Pliskin, Comparison of properties of dielectric films deposited by various methods, Journ. of Vac. Sci. and Tech., vol. 14, No. 5, pp. 1064-1081, Sep./Oct. 1977.
Prasai et al., High precision detection of change in intermediate range order of amorphous zirconia-doped tantala thin films due to annealing, Phys. Rev. Lett. 123 045501 (2019).
Prasai, G. Chen and D. A. Drabold, Amorphous to amorphous insulator-metal transition in GeSe:Ag glasses, Phys. Rev. Materials 1 015603 (2017).
Prasai, P. Biswas and D. A. Drabold, Electronically designed amorphous carbon and silicon, Phys. Stat. Sol. A 213 1653 (2016).
Prasai, P. Biswas and D. A. Drabold, Electrons and Phonons in Amorphous Semiconductors, invited Topical Review in: Semicon. Sci. Tech. 31 073002 (2016).
Prasai, P. Biswas and D. A. Drabold, Sculpting the band gap, a computational approach, Scientific Reports, 5 15522 (2015).
Prasai, P. Biswas, K. Subedi, K, Ferris and D. A. Drabold, Spatial projection of electronic conductivity, the example of conducting bridge computer memory, PSS Rapid Research Letters, https://doi.org/10.1002/pssr.201800238 (2018).
Ramírez-Ortiz et al., "A catalytic application of Cu2O and CuO films deposited over fiberglass," Appl. Surf. Sci., vol. 174, No. 3-4, pp. 177-184, 2001.

Remachea, E. Fourmonda, A. Mahdjoubb, J. Dupuisa, M. Lemitia, Design of porous silicon/PECVD SiOx antireflection coatings for silicon solar cells, Materials Science and Engineering B 176 (2011), pp. 45-48.
Schindler, M. Weides, M. N. Kozicki, R. Waser, Low current resistive switching in Cu—SiO2 cells, Appl. Phys. Lett. 92, 122910 (2008).
Shallenberger, Determination of chemistry and microstructure in SiOx ($0.1 < x < 0.8$) films by x-ray photoelectron spectroscopy, Journal of Vacuum Science & Technology A 14, 693 (1996).
Simmons, R. R. Verderber, Newthin-film resistive memory, The Radio and Electronic Engineer, Aug. 1967.
Soler, E. Artacho, J. D. Gale, A. García, J. Junquera, P. Ordejón, and D. Sánchez-Portal, The SIESTA method for ab-initio order-N materials simulation J. Phys.: Condens. Matt. 14, 2745-2779 (2002).
Sopinskyy, V. Khomchenko, Electroluminescence in SiOx films and SiOx-film-based systems, Current Opinion in Solid State and Materials Science 7 (2003) 97-109.
Stanford Univsersity, "LIGO Group," <https://lvc.sites.stanford.edu/> publicly available at least as early as Jun. 26, 2020.
Štich, M. C. Payne, R. D. King-Smith, J-S. Lin, and L. J. Clarke Ab initio total-energy calculations for extremely large systems: Application to the Takayanagi reconstruction of Si(111) Phys. Rev. Lett. 68, 1351 (1992).
Subedi, K. Prasai, D. A. Drabold, "Space-projected conductivity and the spectral properties of the conduction matrix," Physica Status Solidi B, 2020, 2000438.
Subedi, K. Prasai, M. N. Kozicki, and D. A. Drabold, Structural origins of electronic conduction in amorphous copper-doped alumina, Phys. Rev. Materials 3 065605 (2019).
Suzuki, Y. Ishikawa, M. Isshiki, and Y. Waseda, "Native Oxide Layers Formed on the Surface of Ultra High-Purity Iron and Copper Investigated by Angle Resolved XPS," Mater. Trans. JIM, vol. 38, No. 11, pp. 1004-1009, 1997.
Takayanagi, S. Akao, T. Yanagisawa, N. Nakaso, Y. Tsukahara, S. Hagihara, T. Oizumi, N. Takeda, T. Tsuji, K. Yamanaka, Detection of Trace Water Vapor Using SiOx-Coated Ball SAW Sensor, Materials Transactions, vol. 55, No. 7 (2014) pp. 988 to 993, 2014 The Japanese Society for Non-Destructive Inspection.
Thapa, B. Bhattarai, M. N. Kozicki, K. N. Subedi and D. A. Drabold, Structure and charge transport of amorphous Cu-doped tantalum pentoxide: an ab initio study, Phys. Rev. Materials 4 064603 (2020).
Tomozeiu, Electrical conduction and dielectric relaxation of a-SiOx ($0 < x < 2$) thin films deposited by reactive RF magnetron sputtering, Thin Solid Films 516 (2008) 8199-8204.
U.S. Appl. No. 17/050,750, filed Oct. 26, 2020, Kozicki et al.
U.S. Appl. No. 17/072,701, filed Oct. 16, 2020, Kozicki.
U.S. Appl. No. 17/100,028, filed Nov. 20, 2020, Kozicki.
Van Hapert, Hopping Conduction and Chemical Structure, a study on Silicon Suboxides, PhD Thesis, Universiteit Utrecht, ISBN 90-393-3063-8.
Wang, Yang Yang, Jae-Hwang Lee, Vera Abramova, Huilong Fei, Gedeng Ruan, Edwin L. Thomas, James M. Tour, Nanoporous Silicon Oxide Memory, Nano Lett. 2014, 14, 4694-4699.
Yasser Alajerami, David Drabold, Mohamed Mhareb, Katherine Lesslee, Gang Chen, and Kashi Subedi, Physical, Structural and Shielding properties of Cadmium Bismuth Borate-Based glasses, J. App. Physics 127 175102 (2020).
Yoshida, I. Umezu, N. Sakamoto, M. Inada, A. Sugimura, Effect of structure on radiative recombination processes in amorphous silicon suboxide prepared by rf sputtering, J. Appl. Phys. 92, 5936 (2002).
Zhang and D. A. Drabold, Alternative approach to computing transport coefficients: application to conductivity and Hall coefficient of hydrogenated amorphous silicon, Phys. Rev. Lett. 105 186602 (2010).
Zhang and D. A. Drabold, Electrical conductivity calculations: the role of degenerate and resonant electron states, Phys. Rev. B 81 085210 (2010).
Zhang and D. A. Drabold, Structural and electronic properties of glassy GeSe2 surfaces, Phys. Rev. B 62 15695 (2000).
Zhang and D. A. Drabold, The work done by an external electromagnetic field, J. Phys. Cond. Matter 23 085801 (2011).

(56) References Cited

OTHER PUBLICATIONS

Zhang and D. A. Drabold, Transport calculations in complex materials: a comparison of the Kubo formula, the Kubo-Greenwood formula and the microscopic response method, Phys Rev E 83 012103 (2011).

Zheng, C. N. Xu, E. Tanaka, Y. Tomokiyo, M. Suzuki, and E. S. Otabe, "Charge-spin-orbital coupling in CuO," Phys. C Supercond., vol. 357-360, pp. 181-185, 2001.

Zhou, Tao Du, Lijie Guo, Morten M. Smedskjaer, Mathieu Bauchy, New insights into the structure of sodium silicate glasses by force-enhanced atomic refinement, J. Non. Cryst. Sol. 536 120006 (2020).

United States Patent Office Action for U.S. Appl. No. 17/025,523 dated Jul. 1, 2021 (14 pages).

\* cited by examiner

| Device | Req for 20x20 nm² (this experiment) | Equivalent Req for 1 μm² | Equivalent Req for 100 nm² | Ron | V_SET | Word (Assuming 0.75V is the reference voltage) |
|---|---|---|---|---|---|---|
| Dev1 | 59k | 23.6M | 236G | 3.8k | 0.72V | 0 |
| Dev2 | 33k | 13.2M | 132G | 5.2k | 0.66V | 0 |
| Dev3 | 40k | 16M | 160G | 6.9k | 0.82V | 1 |
| Dev4 | 75k | 30M | 300G | 3.7k | 0.7V | 0 |

PHYSICAL UNCLONABLE FUNCTIONS WITH COPPER-SILICON OXIDE PROGRAMMABLE METALLIZATION CELLS

CROSS-REFERENCE TO RELATED APPLICATIONS

This application is a non-provisional of and claims the benefit of U.S. Provisional Patent Application No. 62/475,725, filed on Mar. 23, 2017, the contents of which are incorporated herein by reference.

BACKGROUND OF THE INVENTION

Internet security has become increasingly important, in part because of the rapidly growing internet of things (IoT). Many IoT devices are currently communicating on open networks with little or no security, making them vulnerable to network intrusion, including distributed denial of service (DDoS) attacks, for example. Most IoT devices, however, are based on low power system on chip (SOC) designs. Thus, full security on these devices is preferably implemented with as little circuit overhead or additional power consumption as possible to meet operational requirements of the IoT.

Current secure communications require random number generation to create a secure key. The security of the key is directly related to the randomness of the number generation. Various software approaches have been used to generate pseudo random binary sequences (PRBS), but these can be cracked with sufficient computing power. Alternatively, naturally occurring randomness in semiconductor device characteristics can provide random number generation via appropriate reading circuitry, from within an integrated circuit, for example, with the generated number being unique to each circuit. This has been demonstrated with static random access memory (SRAM) and resistive random access memory (RRAM). Arrays of these type of memories have been used as generators of Physical Unclonable Functions (PUFs).

Of particular interest are nonvolatile memory cells based on anion or cation migration through a solid electrolyte due to the prospect of low power consumption, high scalability, and multibit data storage. Operation is thought to be through a filamentary switching mechanism based on mobile oxygen vacancies. Metal ions move through, for example, a chalcogenide which acts as solid electrolyte and are reduced at an inert counterelectrode. From there, a metallic filament grows toward the oxidizable electrode and switches the initially high resistive cell to a low resistance state (on). Under reverse bias, the metallic filament is dissolved and the memory cell switches back to the high resistance state (off).

SUMMARY OF THE INVENTION

Disclosed herein are Programmable Metallization Cell (PMC) PUF systems. Even more particularly, disclosed herein are PMC PUF systems based on copper (Cu) and silica/silicon oxide/silicon dioxide ($SiO_2$), both of which are commonly found in foundry complementary metal-oxide-semiconductor (CMOS) processes.

In one embodiment, the invention provides a PUF device including a first copper electrode, a second electrode, and a silicon oxide layer positioned directly between the first copper electrode and the second electrode.

In another embodiment, the invention provides a method of making a PUF device including providing an electrode, subsequently depositing a layer of silicon oxide onto the electrode, and subsequently depositing a copper film onto the layer of silicon oxide to form a copper electrode.

In yet another embodiment, the invention provides an array including a plurality of CMOS transistors and a plurality of PUF devices, which each include a first copper electrode, a second electrode, and a layer of silicon oxide positioned directly between the first copper electrode and the second electrode, where the plurality of PUF devices are positioned above the plurality of CMOS transistors.

In yet another embodiment, the invention provides a method of generating a secure key including providing an array, which includes a plurality of copper lines and a plurality of lines including W, Ni, Pt, TiN, TaN, TiW, or polycrystalline silicon, the plurality of lines being positioned perpendicular to the plurality of copper lines, where a plurality of PUF devices is formed at a plurality of intersections of the plurality of copper lines and the plurality of lines, where each of the plurality of PUF devices includes a first copper electrode, a second electrode, and a layer of silicon oxide positioned directly between the first copper electrode and the second electrode; subsequently placing each of the plurality of PUF devices into an off state; subsequently applying a positive voltage to one of the plurality of copper lines and a negative voltage or a ground voltage to one of the plurality of lines, with all other lines floating; subsequently measuring a parameter of the PUF device at the intersection of the lines; subsequently applying a negative voltage or a ground voltage to the copper line and a positive voltage to the one of the plurality of lines; and repeating the sequence for a different pair of intersecting lines.

In a further embodiment, the invention provides a system comprising an array of devices, wherein each device comprises a first copper electrode, a second electrode, and a layer of silicon oxide positioned directly between the first copper electrode and the second electrode. The array of devices is partitionable such that a portion of the devices generates information and another portion of the array provides memory storage. In one construction, the devices that generate information are activated to provide a stochastic result. In another construction, the stochastic result is provided by a change in resistance. In yet another construction, the devices that provide memory storage are forced into a deterministic state provided by a stable change in resistance. In a further construction, the array of devices is partitionable based on a change in resistance of the devices.

Other aspects of the invention will become apparent by consideration of the detailed description and accompanying drawings.

DETAILED DESCRIPTION

Figure 1:
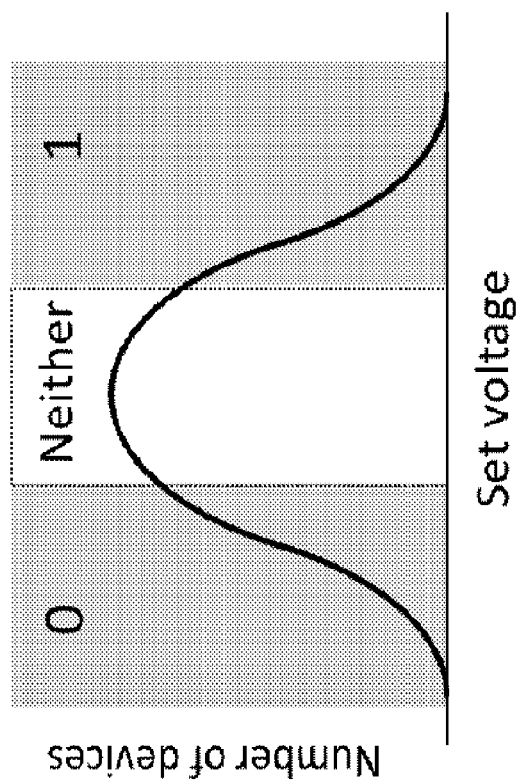
FIG. 1 illustrates a distribution of set (programming) voltage for a PMC array. The distribution can be divided into contiguous 0 and 1 ranges or into 0 and 1 ranges separated by a third state.
Figure 1:
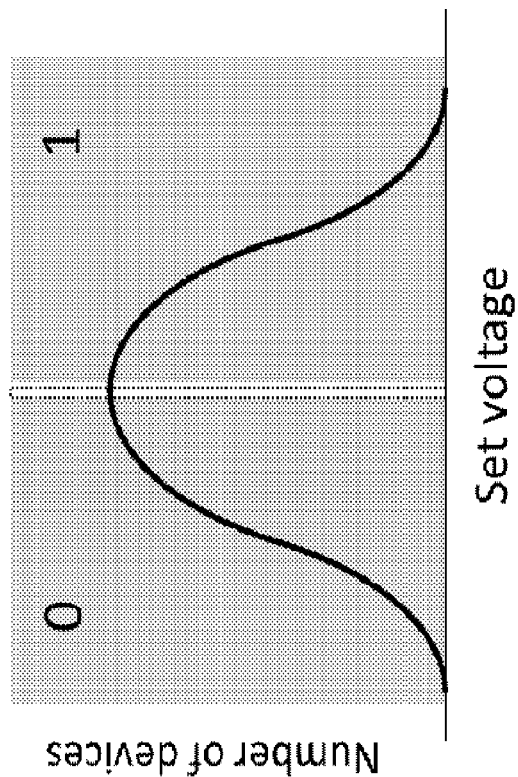

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of", and "consisting essentially of", the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrase "at least one of A, B, . . . and N" or "at least one of A, B, . . . N, or combinations thereof" are defined in the broadest sense to mean one or more elements selected from the group comprising A, B, . . . and N, that is to say, any combination of one or more elements A, B, . . . or N including any one element alone or in combination with one or more of the other elements, which may also include, in combination, additional elements not listed.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For purposes of this disclosure, the chemical elements are identified in accordance with the Periodic Table of the Elements (CAS version) and the Handbook of Chemistry and Physics (98th Ed., inside cover).

The term "silica", as used herein unless otherwise defined, means silicon oxide SiO$_x$, where x may range from greater than or equal to 1 to less than or equal to 2. More particularly, the term "silica" may refer to SiO$_x$ where x equals a single value (within normal experimental tolerance) from 1 to 2, or "silica" may refer to SiO$_x$ where x is a mixture of values from 1 to 2. Even more particularly, the term "silica" may refer to SiO$_x$ where x equals about 1.4.

The term "silicon oxide", as used herein unless otherwise defined, means SiO$_x$, where x may range from greater than or equal to 1 to less than or equal to 2. More particularly, the term "silicon oxide" may refer to SiO$_x$ where x equals a single value (within normal experimental tolerance) from 1 to 2, or "silicon oxide" may refer to SiO$_x$ where x is a mixture of values from 1 to 2. Even more particularly, the term "silicon oxide" may refer to SiO$_x$ where x equals about 1.4.

A PUF is embodied in a physical structure, such as a memory array, and has the characteristic of being easy to evaluate but hard to predict due to the randomness of the underlying mechanism. For practical security applications, a PUF system should be simple to make but difficult to duplicate, even when the exact manufacturing process that produced it is known. Randomness occurs naturally at the nanoscale in materials that make up memory arrays, which leads to randomly distributed cell characteristics in these devices.

Programmable resistance devices, such as the Programmable Metallization Cell (PMC), exhibit subtle random differences in operational parameters from cell to cell, due to the stochastic nature of the formation of the conducting pathway. For example, the voltage at which the devices transition from a high resistance "off" state to some low resistance "on" state, the set voltage, varies randomly across an array of PMCs. This parameter can be partitioned into ranges representing logic 0 and logic 1, with the possibility of intermediate states being defined in an intervening range, as shown in FIG. 1. In this approach, the length of a random word is directly proportional to the size of the array.

PMC Arrays and PUFs

PUFs can strengthen the authentication methods of IoT elements, because they act as "digital signatures" of the hardware; to support security protocols PUFs can also operate as data-base-free authentication devices, as no secret keys or passwords have to be stored in the IoT; the cost structure of most PUFs is, in general, very low. PUFs exploit intrinsic manufacturing variations introduced during the fabrication of the electronic components of the IoTs. Variations such as critical dimensions, doping levels of semiconducting layers, and threshold voltages make each component unique and identifiable from each other. The PUF's underlying mechanism is the creation of a large number of challenges (i.e. input), responses (i.e. output), and pairs (called CRPs) which are unique to each device. Once deployed during the authentication cycles, PUFs are queried with challenges. The authentication is granted when the rate of correct matching responses is statistically high enough. PUFs can be generated with several components, such as ring oscillators and circuits with gate delays with field-programmable gate array (FPGA), static random access memories (SRAMs), sensors and microelectromechanical systems (MEMS) devices, Flash memories, magnetic memories, and various resistive random access memory (RAM) components.

However, PUFs can have (i) a lack of stability of the physical parameters that creates high CRP error rates due to natural drifts or noisy conditions, and (ii) insufficient secret properties of the PUFs that make them vulnerable through side channel analysis by hackers. PUFs based on existing technologies often struggle to deliver in these two areas, and this is because these two limitations are often in conflict with each other: strong PUFs can have low CRP error rates but be too easy to analyze, while weak PUFs can have high CRP error rates and be well protected from side channel analysis. PMCs are attractive because their cells operate at extremely low voltage and low power, below the detectable level of side channel analysis.

Unlike most resistive switching elements, PMC devices can operate in the pico-joule range. The state of a PMC is defined by the formation of a conductive filament (CF) within a solid electrolyte encased between two electrodes. When a CF is formed, a low resistive state (LRS) is established. In the absence of a CF, the memory cell has high resistive states (HRS), orders of magnitude higher than the LRS. The programing voltage to form CFs, the $V_{set}$, is typically in the 0.1 V to 0.6 V range. This is 2 to 20 times lower than the programming voltage of other resistive switching devices, and 100 times lower than Flash memory. Unlike Flash, PMC has low capacitance, which makes the read operation fast, in the 1 ns to 10 ns range, and allows constant current sensing. As a result, side channel analysis, such as differential power and electromagnetic interference analysis, are highly ineffective in extracting confidential information.

PMC PUF Systems

PMC devices exhibit subtle random differences in operational parameters from cell to cell, due to the stochastic nature of the formation of the conducting pathway. The voltage, for example, at which the devices transition from a high resistance off state to some low resistance on state, the set voltage, varies randomly across an array of PMCs. This parameter can be partitioned into ranges representing logic 0 and logic 1, with the possibility of intermediate states being defined in an intervening range, as shown in FIG. 1. In this approach, the length of a random word is directly proportional to the size of the array.

Although some material systems exhibit switching behavior, very few are easily integrated with CMOS logic. In certain embodiments, the invention disclosed herein is a PMC PUF system based on copper and silicon oxide, both of which are commonly found in foundry CMOS processes. This enables a simple and inexpensive addition of sophisticated security features, as described above, into almost any integrated circuit.

Additionally or alternatively, certain embodiments can operate with very low current, leading to low power/low energy performance. For example, a full switching operation may require about 3 V and about 100 µA for about 400 µs, which gives 300 µW and 120 nJ for power and energy, respectively. In certain embodiments, the operating current may be as low as about 10 nA. In certain other embodiments, the operating current may be as low as about 10 pA, such as for certain copper-silicon oxide devices.

In certain embodiments, PUF generation may utilize lower power and energy because, at least in part, complete switching is not required to generate random numbers (i.e., set voltage can be determined without fully switching a device to a low resistance on state). In certain embodiments, using very small currents and voltages which alter the metal concentration in a region between the electrodes but which does not result in a continuous stable filament results in volatile device operation, which may dispose the need for pre-erase and/or post-erase steps, as described below.

Figure 2:
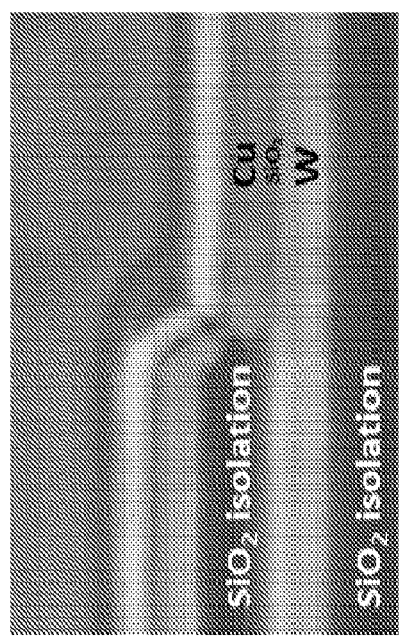
FIG. 2 shows a schematic and cross-sectional electron micrograph of an individual Cu—$SiO_2$ PMC structure. In the illustrated embodiment, the lower electrode is W, and the device is formed in a via hole in an isolating layer formed by PECVD between the metal films.
Figure 2:
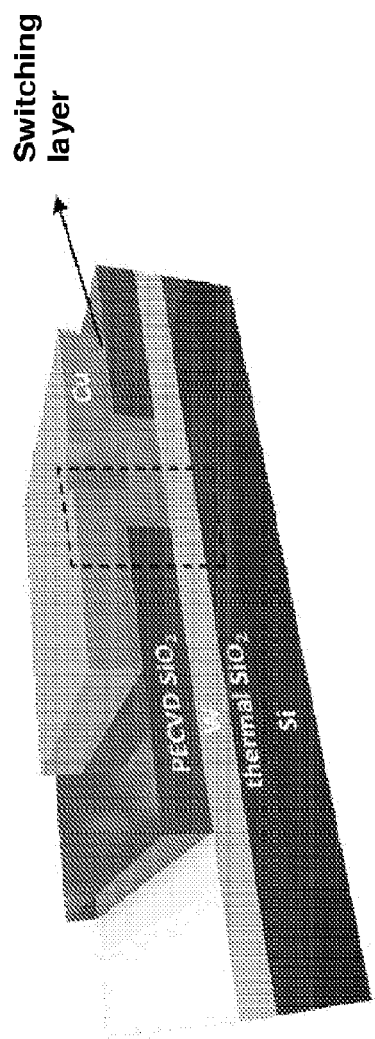
Figure 3:
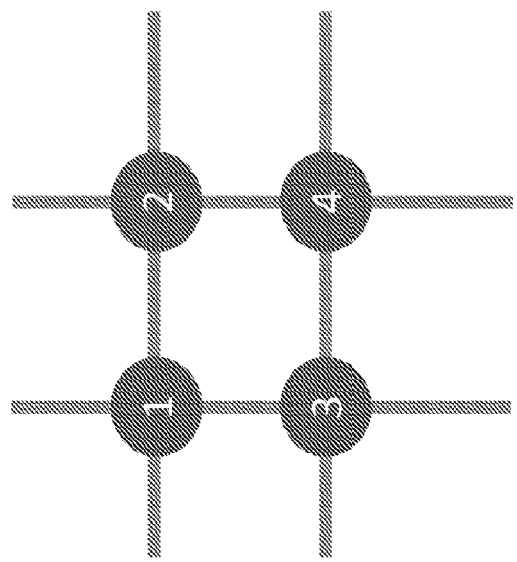
FIG. 3 illustrates a generation protocol for an active array.
Figure 3:
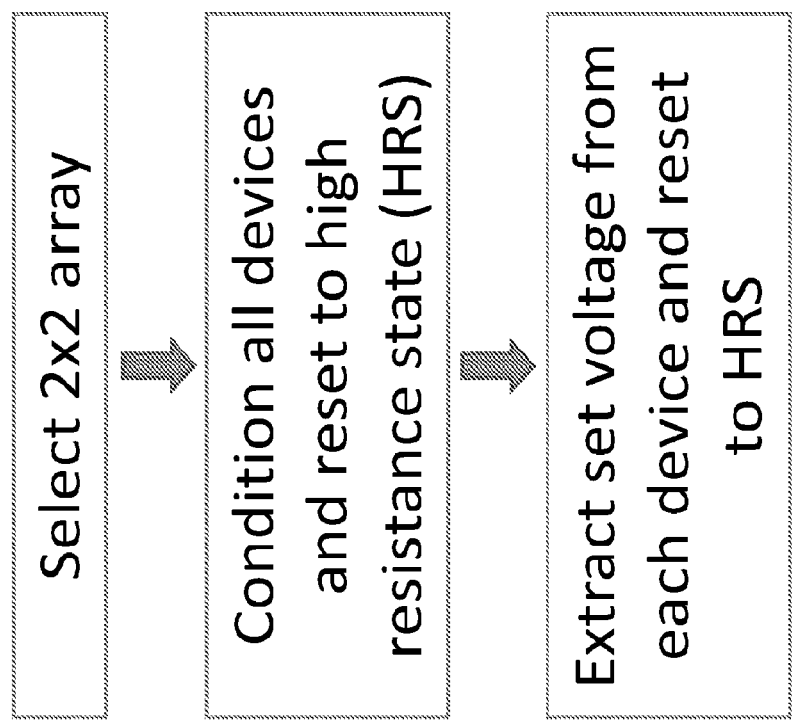
Figure 4:
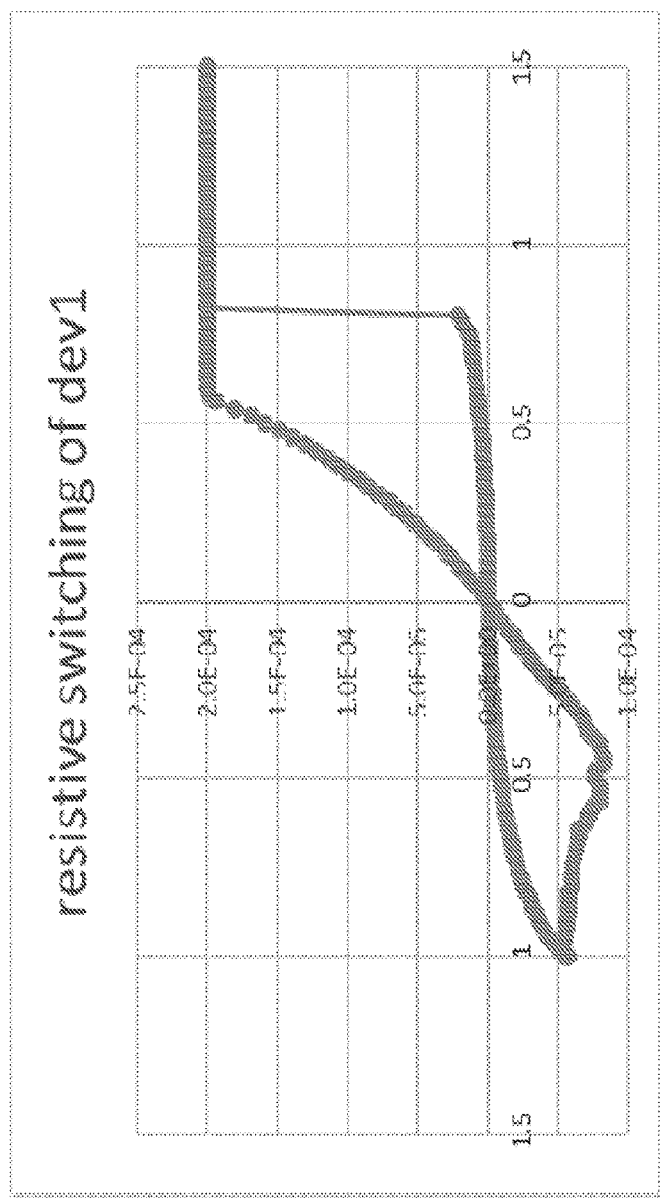
FIG. 4 shows a typical plot illustrating the set voltage of an individual PMC structure.
Figure 4:
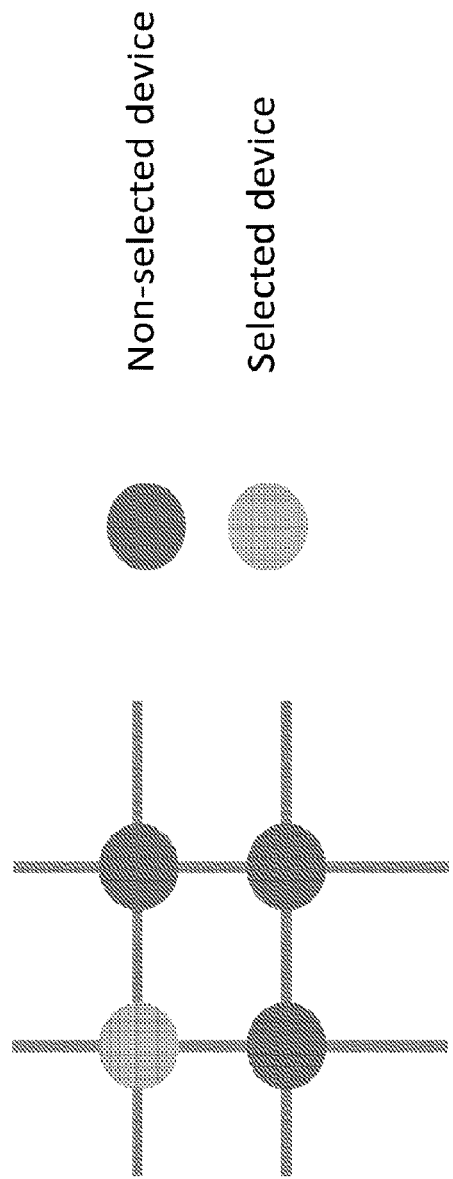
Figure 5:
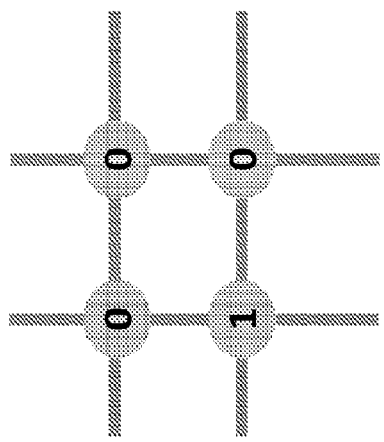
FIG. 5 shows a table that further illustrates the generation protocol of FIG. 3.

As illustrated in FIG. 2, a copper-silicon oxide cell may comprise a "lower" electrode, a switching layer, and an "upper" electrode. In certain embodiments, the lower electrode is a tungsten (W) electrode. In certain embodiments, the switching layer is a thin layer of silicon dioxide ($SiO_2$). In certain other embodiments, the switching layer is a thin layer of silicon oxide ($SiO_x$, where x can range from 1 to 2; for example, x equals about 1.4) or silica. In certain embodiments, the upper electrode is a copper (Cu) electrode. The metal layers may be isolated from each other in non-device regions by a relatively thick layer of a dielectric. In certain embodiments, this dielectric is $SiO_2$ or silicon oxide.

A variety of lower electrodes may be used. The lower electrode material is preferably relatively electrochemically inert, such as tungsten (W), nickel (Ni), platinum (Pt), titanium nitride (TiN), tantalum nitride (TaN), titanium tungsten (TiW), or polycrystalline silicon (poly-Si), for example. A variety of dielectric materials may be used for the isolation, such as thick $SiO_2$, $Si_3N_4$, or various dielectric polymers, for example. The isolation material may be formed by a variety of methods commonly known in the art.

In certain embodiments, a copper-silicon oxide PMC structure may be formed in a via hole. More particularly, a copper-silicon oxide PMC structure may be formed in a via hole in a plasma-enhanced chemical vapor deposition (PECVD) isolating layer between metal films. Alternatively, a copper-silicon oxide PMC structure can be "planar" instead of recessed into a via hole, with the lower electrode surface being level with the top surface of the isolating dielectric and the switching layer and top electrode being relatively flat. In other words, the structure has a planarized lower electrode such that both the switching layer and the top electrode may be flat.

A PMC device may switch by formation of a Cu bridge within the switching layer between electrodes. The Cu bridge may form upon application of an appropriate voltage. If the silicon oxide switching layer is relatively porous and amenable to transport of Cu ions within its structure, the switching may occur at low energy and/or without damaging the PMC device (e.g., breakdown).

The switching layer may be formed by physical vapor deposition (PVD). An isolated lower electrode structure may be formed first. A thin layer of silicon oxide may be formed using PVD, including sputtering or evaporation. In certain embodiments, the thin layer of silicon oxide is about 15 nm thick. The PVD conditions may be chosen to ensure formation of a relatively low density silicon oxide film. In certain embodiments, a relatively low density silicon oxide film may be formed by a high deposition rate. Then, a thin Cu film may be deposited. In certain embodiments, the thin Cu film is about 50 nm thick. Additionally or alternatively, the thin Cu film may be deposited by sputtering. Then, an annealing step may be performed. Annealing may drive Cu from the thin Cu film into the oxide (e.g. silicon oxide or $SiO_2$) layer. In certain embodiments, this annealing step occurs at about 500° C. for about 10 minutes. In certain other embodiments, this annealing step occurs at about 500° C. to about 600° C. for about 10 minutes to about 20 minutes. Additionally or alternatively, the annealing step may occur in pure $N_2$, $N_2/H_2$, or Ar gas. These processes can be performed with equipment or techniques commonly known in the art, such as RF sputter deposition (for silicon oxide), DC sputter deposition (for Cu), inert gas annealing furnace, lithography, and/or reactive ion etching (RIE) (thin Cu may be ion milled) for patterning, for example.

As an example, the PVD deposition rate may be about 1 Å/sec, the deposition temperature may be about room temperature, and the deposition pressure may be about $10^{-6}$ torr. These PVD conditions may result in a low density silicon oxide film having a density of about 2.08 $g/cm^3$. For comparison, the normal density of amorphous silicon dioxide is about 2.2 $g/cm^3$. In certain embodiments, the density of the silicon oxide film is less than or equal to about 2.20 $g/cm^3$, about 2.15 $g/cm^3$, or about 2.10 $g/cm^3$. Alternately, a low density may be achieved by using plasma enhanced chemical vapor deposition (PECVD) at a low temperature, such as at less than 200° C., for example.

Alternately, the switching layer may be formed by chemical vapor deposition (CVD). An isolated lower electrode structure may be formed first. A thin layer of silicon oxide may be formed using remote plasma chemical vapor deposition (RPCVD). In certain embodiments, the thin layer is about 5 nm thick. Additionally or alternatively, the RPCVD may be at about 200° C. Then, a thin Cu film may be deposited. In certain embodiments, the thin Cu film is about 50 nm thick. Additionally or alternatively, the thin Cu film may be deposited by sputtering. These processes can be performed with equipment or techniques commonly known in the art, such as an RPCVD system (for silicon oxide), DC sputter deposition (for Cu), lithography, and/or RIE (thin Cu may be ion milled) for patterning, for example.

In certain embodiments, the thin layer of silicon oxide may have a thickness of about 5 nm to about 20 nm, about 10 nm to about 20 nm, about 15 nm to about 20 nm, about 5 nm to about 15 nm, about 5 nm to about 10 nm, about 10 nm to about 20 nm, or about 10 nm to about 25 nm. In certain embodiments, the thin layer of silicon oxide may have a thickness of about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, or about 20 nm.

In certain embodiments, the thin copper film may have a thickness of about 20 nm to about 200 nm, about 20 nm to about 180 nm, about 20 nm to about 160 nm, about 20 nm to about 140 nm, about 20 nm to about 120 nm, about 20 nm to about 100 nm, about 20 nm to about 80 nm, about 20 nm to about 60 nm, or about 20 nm to about 40 nm. In certain embodiments, the thin copper film may have a thickness of about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, or about 200 nm.

Relatively thick switching layers may require a "forming" step in which a switchable filament is formed at a voltage above the normal operating level. In certain embodiments, relatively thick can be defined as a layer having a thickness of greater than about 10 nm, thickness being measured perpendicular to the planar surface of the layer. In the case of a 15 nm thick $SiO_2$ layer, for example, the forming voltage is over 3 V. This same forming voltage drops to less than 2 V after an annealing step to drive Cu into the oxide. A lower forming voltage is advantageous for in low power/low voltage circuits. In certain embodiments, a normal operating DC set voltage is in the order of 0.5 V. This set voltage may rise when short pulse programming is used, however. One advantage of a relatively thick switching layer is that the off-state resistance can be extremely high, such as greater than about 1 GΩ, for example. Very thin switching layers (e.g., less than about 10 nm), on the other hand, may not require an annealing step during production. This may be true in particular for a highly porous switching layer, such as an RPCVD oxide, for example. The off-state resistance is also typically lower (e.g., 100 kΩ) compared to when the switching layer is relatively thick.

In certain embodiments, a PMC device may be fabricated in metal layers above a CMOS transistor. In certain other embodiments, a PMC device may be fabricated in metal layers connected to a CMOS transistor. In yet other embodiments, a PMC device may be fabricated in metal layers in direct contact with a CMOS transistor. These may constitute an "active" array in which each PMC device fabricated in metal layers above CMOS transistors is accessed via its own transistor (i.e., the individual transistor below each PMC device). In an active array, each binary digit in a secure word may be generated by an individual "1T-1R" (one transistor, one resistor) cell so that the number of cells in the array is equal to the word length. A device parameter, such as set voltage or on-state resistance, for example, may be determined for each cell by turning on its corresponding transistor and performing a measurement with all other transistors turned off.

Figure 6:
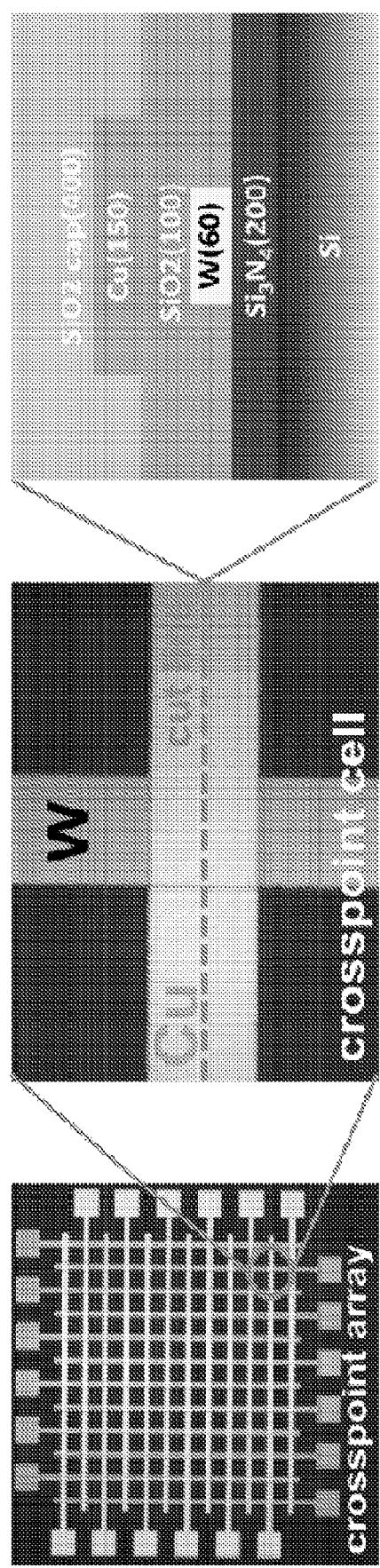
FIG. 6 shows optical micrographs of a 12×12 cross-point array of Cu—SiO$_2$ PMC cells with tungsten lower electrode and a single device within the array, and a schematic diagram of the cross-section of a cell. A PMC device is formed at each crossing point of the tungsten and copper lines.

Alternatively, PMC devices can be arranged in a crosspoint array, as illustrated in FIG. 6. This may constitute a "passive" array. The copper-silicon oxide PMC elements may be formed at each intersection of, for example, W (column) and Cu (row) lines. In certain embodiments, the non-Cu line may be a material other than W. These PMC elements may not be accessed via a transistor, as described above, which may make the overall structure simpler to produce. Additionally, multiple arrays may be stacked, saving physical area in an integrated circuit, for example. Such a crosspoint array may employ non-linear elements, such as diodes, for example. These non-linear elements may prevent on-state (low resistance) devices from shorting rows and columns together. In certain embodiments, no non-linear elements are required. This crosspoint approach has the advantage of being an extremely convenient implementation of a PUF within an integrated circuit.

Figure 7:
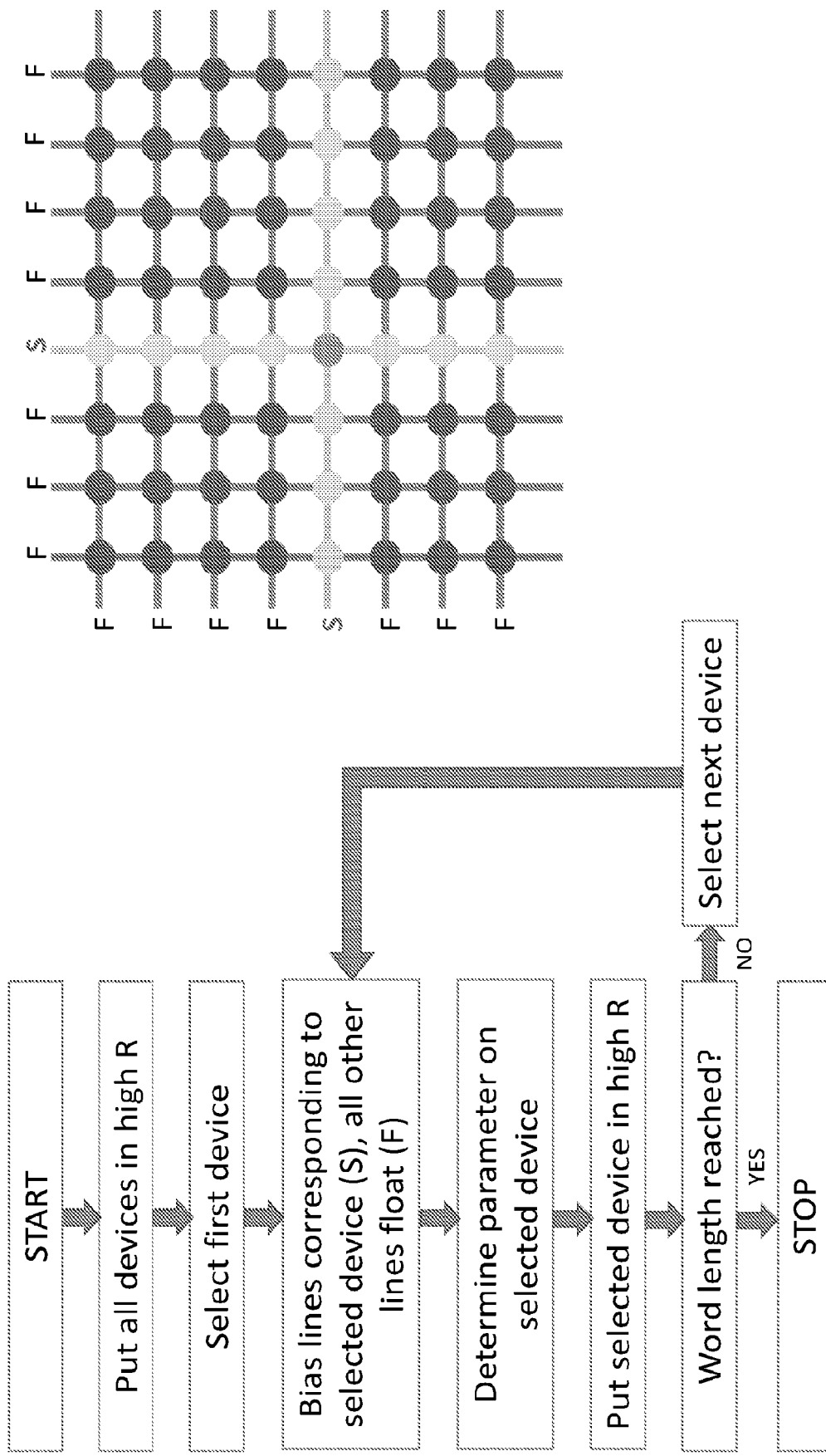
FIG. 7 illustrates a generation protocol for a cross-point array.

In the crosspoint concept, each individual cell may be accessed with all others reset to their off state. This may reduce "sneak path" currents through non-selected cells, since the devices are essentially connected together. As illustrated in FIG. 7, a generation protocol may involve placing all devices in their off state, accessing a device by applying a positive voltage to its corresponding Cu line and a negative voltage or ground voltage to its corresponding W line with all other lines floating, measuring a parameter of interest for the selected device, erasing this device by applying a negative voltage or ground voltage to its corresponding Cu line and a positive voltage to its corresponding W line, and repeating this sequence for the next selected device.

In other embodiments, the need for pre-erase and/or post-erase steps (e.g., applying a negative or ground voltage after a positive voltage) can be avoided with volatile device operation. Volatile/transient resistance states can be created in at least two ways: a) by using very small currents and voltages which alter the metal concentration in a region between the electrodes but which do not result in a continuous and stable filament or b) by creating a structure that results in a high concentration gradient between the on state conducting region and the surrounding material so that the pathway dissolves spontaneously. The low current/low voltage method, which is applicable to any device structure, is of particular benefit to high security applications as it is more resistant to side channel attacks due to the low programming energy used.

Volatile devices use a switching oxide that does not contain a high copper concentration (i.e., it is relatively undoped, e.g., less than about 1 at % Cu in the oxide) so that a copper-rich pathway will spontaneously dissolve back into the surrounding ion conductor.

EXAMPLE

A device which contains a thin layer of deposited silicon dioxide, silicon oxide, or silica between two electrodes, one of which is copper, can be reversibly switched between high and low resistance states upon application of an appropriate voltage. Subtle differences in operational parameters exist between such devices due to the stochastic nature of the switching process. In particular, the precise voltage at which each device transitions from its high resistance off state to a low resistance on state will vary randomly from device to device. This parameter can be obtained from several devices by electronic means and the results partitioned into ranges representing logic 0 and logic 1, so that an array of devices can generate a random binary word. The word is impossible to predict a priori, as complex and variable atomic scale processes in multiple nanoscale devices are responsible for its generation, but it is simple to read by electrical means. A physical entity that has a property which is easy to evaluate but hard to predict lies at the heart of the physical unclonable function concept, and these entities have considerable utility in cryptography.

A PUF based on copper and silicon oxide enables simple and inexpensive addition of sophisticated security features into virtually any integrated circuit, as these materials are commonly used in foundry CMOS processes. These devices also operate with low current and voltage, leading to low power/low energy performance. In addition to their process compatibility, copper-silicon oxide devices may be readily fabricated in the metal layers above the CMOS transistors in the form of a cross-point array (as described above), reducing silicon real estate and corresponding implementation cost and design complexity. In a cross-point array, all devices are essentially interconnected so each cell should typically be evaluated with all others placed in their off state to reduce currents through non-selected cells that may confuse the result.

The combination of copper-silicon oxide devices in a cross-point array leads to the possibility of extremely complex (large word length) PUFs that are low cost and readily added to silicon circuitry.

Figure 8:
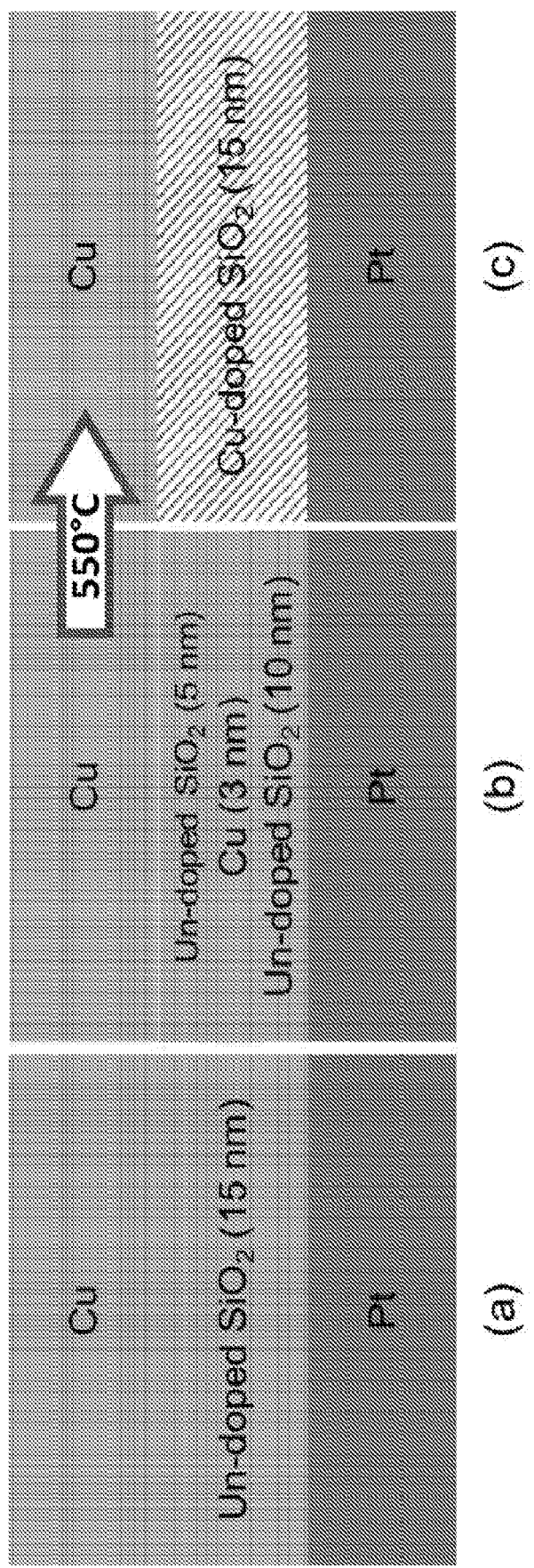
FIG. 8 is a schematic cross-section illustration of PMC samples: a) Cu/SiO$_2$/Pt PMC, b) Cu/Cu:SiO$_2$/Pt PMC before annealing, c) Cu/Cu:SiO$_2$/Pt PMC after thermal annealing at 550° C. for 10 minutes.

PMC devices with a $Cu/SiO_2/Pt$ vertical stack were fabricated on $Si_3N_4$ coated 4 inch Si wafers. First, a stack of 5 nm Ti, 90 nm Pt, and 5 nm Ti was sequentially e-beam evaporated as a common inert electrode, followed by a 100 nm PECVD $SiO_2$ deposition. Photolithography and wet etching was then performed on this PECVD layer to create holes for the devices and to expose the inert electrode pads. The wafers were then divided into two pieces to allow different process flows for each half. One half was transferred to a PVD chamber and a 15 nm $SiO_2$ switching layer was e-beam evaporated. For the other half wafer, a tri-layer stack of 10 nm $SiO_2$/3 nm Cu/5 nm $SiO_2$ was sequentially e-beam evaporated without breaking the vacuum. The cumulative thickness of the $SiO_2$ was kept the same for both scenarios. The tri-layer devices were then annealed at 550° C. for 10 minutes in a nitrogen ambient to thermally diffuse the sandwiched Cu layer into the surrounding $SiO_2$ layers. No thermal annealing was performed on the single oxide layer samples. Photolithography was then performed on both pieces to define the active electrode patterns by Cu film deposition and a lift-off process. The non-annealed and therefore undoped PMC samples are labeled as "$Cu/SiO_2/Pt$" and the annealed and Cu-doped PMCs are labeled as "$Cu/Cu:SiO_2/Pt$", as schematically shown in FIG. 8.

For electrical measurements, a high speed transistor was connected in series with the PMC device to limit the transient current overshoot during device conditioning and programming. The active electrode was biased, the inert electrode was connected to the drain of the transistor, and the source of the transistor was grounded. The compliance current was controlled by the gate voltage of the transistor.

In resistive switching memory, the low resistance-state (LRS) value can be adjusted by altering the compliance current during a dc set operation; the LRS decreases with the increase of compliance current. Prior to the complete bridging of the electrodes by the filament, the LRS decrease is caused by the vertical growth of filament which narrows the tunneling gap between the filament tip and electrode. Once the filament contacts the opposing electrode, any further reduction in the LRS is a result of filament radial growth. Stability requirements for the conductive filament vary from application to application. For example, a robust filament is necessary for non-volatile memory applications while a weak filament is desirable for applications such as low refresh dynamic memory, inherent selectors for non-destructive readout of complementary resistive switches, or, as in the present exemplary embodiment, threshold switches operating as a selector device in crosspoint arrays. The stability of the LRS is dependent on the compliance current with the LRS being most volatile at a small current (typically less than about 10 μA), while non-volatility ensues if the compliance current is sufficiently large (typically greater than about 50 μA). A possible explanation for the volatile switching is the formation of unstable, narrow, or even discontinuous conductive filaments at low compliance currents.

Figure 9:
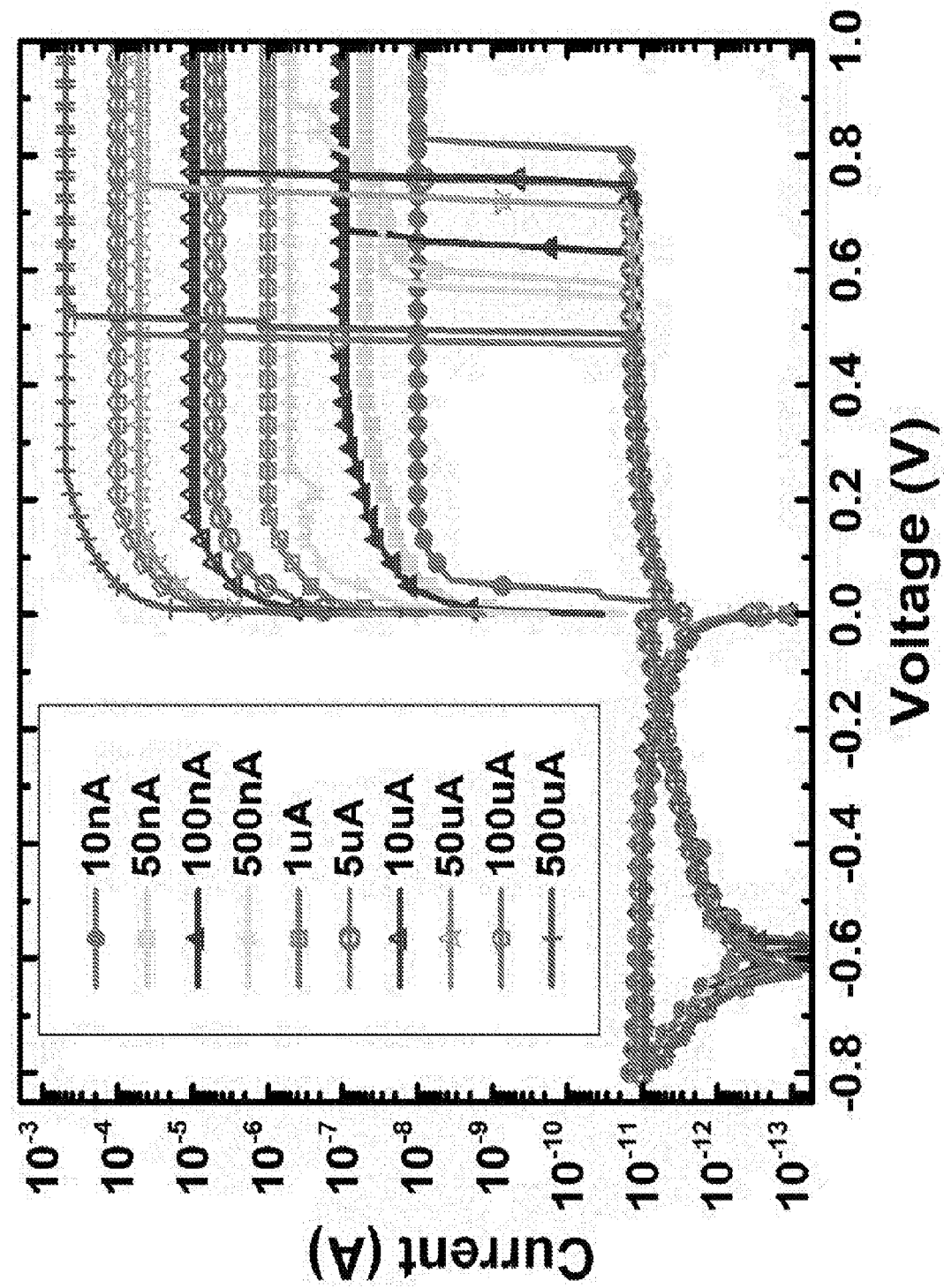
FIG. 9 shows a typical threshold switching I-V characteristics of a Cu/SiO$_2$/Pt PMC.

In order to examine the compliance current effect on the $Cu/SiO_2/Pt$ PMC device, a 5×5 μm² device was swept with a range of compliance currents ranging from 10 nA to 500 μA. The results are shown in FIG. 9. For each test, the Cu electrode voltage was first swept from 0 V to 1 V and back to 0 V in one continuous double sweep. Then the Cu electrode voltage was swept from 0 V to 0.8 V and returned to 0 V. As shown in FIG. 9, the device switched from the HRS to the LRS at a positive threshold voltage (Vth) between 0.5 V and 0.8 V, at which point the current rises rapidly to the compliance limit. The device's LRS value is maintained when the positive voltage is sufficiently large; but the filament ruptures spontaneously when the voltage is reduced to a small, typically positive voltage, thus restoring the device to its HRS condition. This volatility is clearly shown in FIG. 9 by the very low currents measured over the reverse bias range (between 0 V and 0.8 V). In all cases the device has spontaneously transitioned to the HRS regime. The results demonstrate that volatility is independent of compliance current up to 500 µA for the Cu/SiO$_2$/Pt PMC. Moreover, the threshold switching behavior over the 0 to 1 V sweep resembles the I-V characteristics of a diode in breakdown. A rectifying ratio of about $5 \times 10^7$ can be obtained if the current is read at 0.8 V with a 500 µA programming/compliance current. The rectifying ratio can be further increased in smaller devices since the HRS resistance is inversely proportional to the device area while LRS resistance is not dependent on device size. Such a high rectifying ratio shows that this device may be useful as a sneak path blocking selector.

Figure 10:
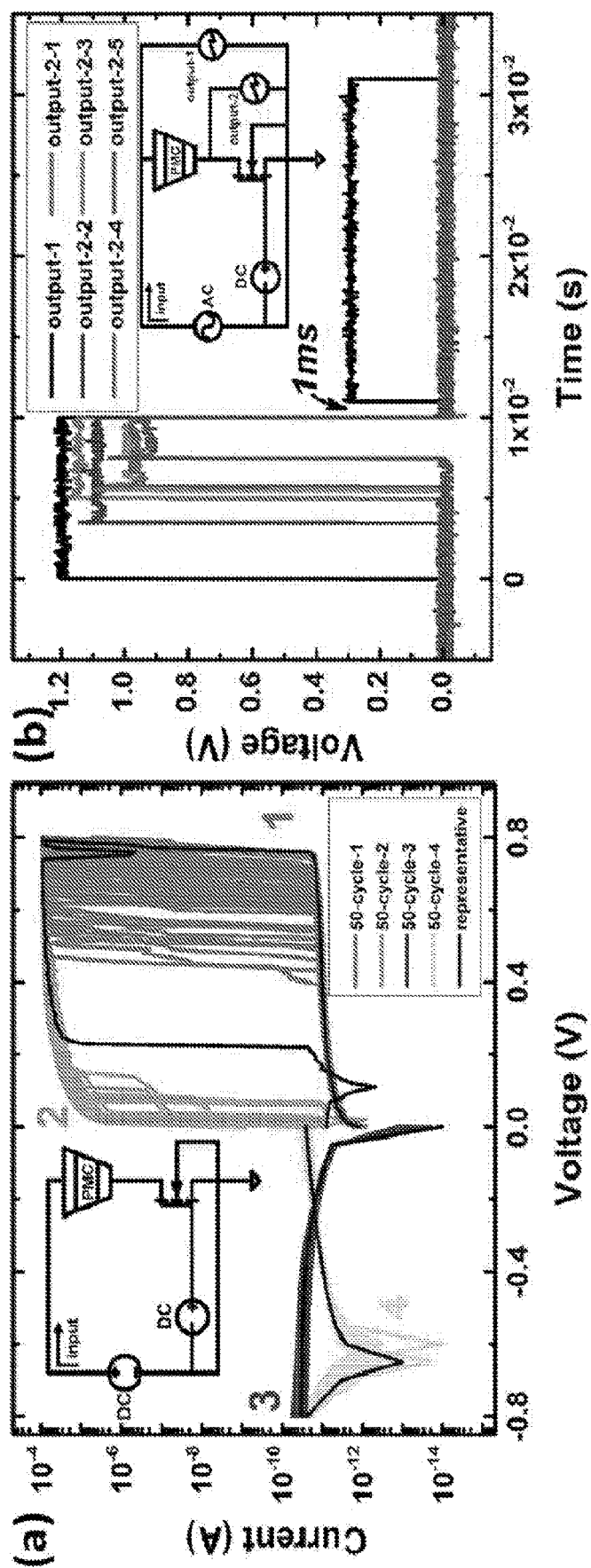
FIG. 10 shows a) cycling of threshold switching with a 100 μA compliance current and b) a pulsing scheme showing device returning to its high resistance-state (HRS) in less than 1 ms at zero applied bias regardless of programming condition.

The HRS stability of the Cu/SiO$_2$/Pt device was also investigated because this is important for the suppression of sneak path currents. The device was dc swept for 50 cycles with a relatively high current (for normal resistive device operation) compliance of 100 µA in order to accelerate the degradation of the HRS. The test schematic is illustrated in the inset of FIG. 10a. The switching current is limited by the saturation current of the transistor. The voltage was swept between −0.8 V and 0.8 V and the labeled numbers indicate the sweeping sequence in each cycle. As can be seen in FIG. 10a, the filament spontaneously ruptures even when the positive voltage is still applied and no memory trace was found in the negative voltage side for all repeated cycles. The HRS current is below $10^{-10}$ A out to −0.8 V and is tightly distributed from cycle to cycle with no obvious degradation being observed. The small variation in HRS current indicates that no significant Cu residues are left in the filament region after it dissolves. It should be noticed that the threshold voltage is not tightly distributed in FIG. 10a. Such variation poses threats to reliable reading/programming operations when the memory cell is integrated, but this problem may be alleviated through process control during device fabrication. Since this device type switches to the HRS while a small positive bias is applied, it is likely that the Cu atoms from the filament are absorbed by the surrounding SiO$_2$ matrix, causing conductive pathways to disappear. Engineering the electrolyte layer to be intentionally Cu deficient enables diffusion processes to support rapid filament dissolution.

Another important property of threshold switching is the volatilizing speed, i.e., the speed of filament rupture when the voltage bias is removed. A pulse test scenario was conducted to assess this on five Cu/SiO$_2$/Pt devices and the results are shown in FIG. 10b. The test schematic is illustrated in the inset of FIG. 10b. A compliance current of 100 µA was set with the transistor. Write pulses were first generated to program the devices to their LRS followed by smaller amplitude but longer read pulses, as shown in FIG. 10b. No bias was applied in the period between the write and read pulse. The write pulse was 1.2 V high and 10 ms long, the read pulse was 0.3 V high and 20 ms long, and a minimum of 1 ms time gap was chosen in order to clearly distinguish the effects of the write and read pulses. By comparing the waveform received by channel-1 (output-1) and channel-2 (output-2) of an oscilloscope, it could be seen that the devices were programmed to their LRS in a few milliseconds. The LRS were randomly programmed to be 390Ω, 860Ω, 1.83 kΩ, 2.04 kΩ and 2.45 kΩ, and, all of the devices quickly recovered to their HRS in less than 1 ms once the voltage was removed as a negligible readout voltage was observed in output-2 over the read time interval.

Figure 11:
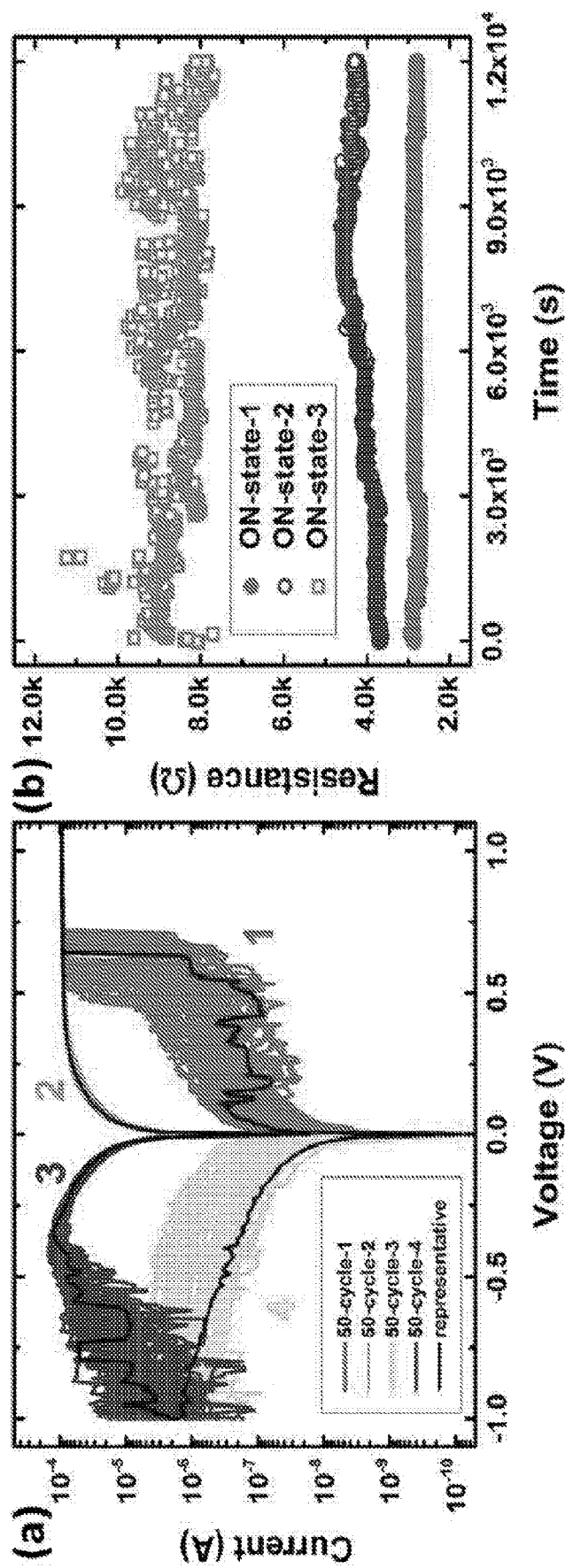
FIG. 11 shows a) 50 cycles bipolar memory switching of a Cu-doped device and b) the low resistance-state (LRS) retention characteristics.

The I-V characteristics of a Cu/Cu:SiO$_2$/Pt PMC device are given in FIG. 11a, using the same test setup shown in the inset of FIG. 10a. The device was cycled 50 times using voltage sweeps with a 100 µA compliance current. It can be seen from FIG. 11a that the Cu doped device shows bipolar resistive switching behavior. The conductive filament is maintained even with a negative bias applied and can only be dissolved when the applied negative bias is large enough (less than −0.5 V). In addition, the reset current is comparable to the set current which indicates good control of transient current overshoot during programming. However, the HRS resistance of Cu/Cu:SiO$_2$/Pt device is orders of magnitude lower than that of Cu/SiO$_2$/Pt devices and it possesses a larger cycle-to-cycle variation.

The retention characteristics of the LRS were assessed and the results are shown in FIG. 11b. The device was switched to three different LRS values, i.e., 3 kΩ, 4 kΩ, and 9 kΩ. Each device resistance was sampled for $1.2 \times 10^4$ seconds at room temperature. During the testing, a 100 mV read voltage was applied every 10 seconds. It can be seen that although fluctuations were observed for the largest LRS, a clear separation between the different LRS values is evident. FIG. 11b demonstrates that the LRS is stable for a range of programmed values, which suggests that the Cu doped PMC device may be a good technology for non-volatile memory applications.

It is worth noting that the volatile threshold switching behavior is preserved in the Cu/SiO$_2$/Pt devices even for a compliance current as high as 500 µA. This is more than enough to achieve non-volatile switching in resistive memory devices. In the undoped devices, simply increasing compliance current is not enough for the device to exhibit memory switching, i.e., stable filament formation. The volatility of the Cu/SiO$_2$/Pt device may be due to the porous structure of the e-beam evaporated SiO$_2$ and the large concentration gradient between the Cu-rich conducting region and the surrounding (undoped) oxide, both of which allow fast dissolution of the Cu filament. It should be mentioned that absorbed moisture in porous oxides can also be responsible for filament instability. Cyclic voltammetry (CV) studies show that an electromotive force (emf) exists in the presence of moisture in PMC devices, and such emf creates an additional voltage that oxidizes the Cu filament and impacts LRS retention. Thermal doping of the SiO$_2$ with Cu for the Cu/Cu:SiO$_2$/Pt PMC aids in the suppression of this volatility. By thermal doping, not only is the concentration gradient reduced, but the diffusion coefficient is lowered by decreasing the probability of ions "finding" vacant sites in the otherwise porous oxide. Thermal treatments can also reduce the emf influence by reducing the moisture concentration in the SiO$_2$. HRS fluctuation in the Cu/Cu:SiO$_2$/Pt device might be caused by the randomly distributed Cu residues left in the local conductive region after reset, which also confirms that the diffusion of Cu atoms was greatly suppressed by thermal doping.

Considering that the selector is strongly rectifying in the voltage range used, a 1S1R configuration would only suit unipolar memories where programming and erasing occurs with the same voltage polarity. For bipolar switching devices as shown in FIG. 11a, a 2S1R configuration, with two selectors connected in an anti-parallel configuration, would be required for a successful erase operation.

It should be kept in mind that the embodiments described herein are only presented by way of example and should not be construed as limiting the inventive concept to any particular physical configuration. Although primarily illustrated as a PUF device capable of information generation, it should be appreciated that the disclosed device could take a variety of other forms, operations, or applications, for example, a memory device capable of information storage. Rather than stimulating the device to produce a stochastic response and thereby generate a random key (i.e., information generation), the device could be stimulated to produce a deterministic response, changing the device from one resistance state to another (i.e., information storage). For example, an array of copper-silicon oxide devices can be partitioned such that part of the array is used for information generation (PUF) and part of the array is used for information storage (memory). The partitioning could be either hardware-based (e.g., connections) or software-based (e.g., programming). The partitioning could range from 0% PUF/100% memory to 100% PUF/0% memory, depending on the desired application. For example, a partitioning of greater than 50% PUF may be desirable when generating a very long key, where the remaining memory part could be used to store information useful to the operation of the system.

Various features and advantages of the invention are set forth in the following claims.

What is claimed is:

1. A physical unclonable functions (PUF) device comprising:
   a first copper electrode;
   a second electrode;
   a layer of silicon oxide positioned directly between and in contact with both the first copper electrode and the second electrode; and
   an insulating layer is positioned directly between the second electrode and a circuit.

2. The PUF device of claim 1, wherein the second electrode comprises W, Ni, Pt, TiN, TaN, TiW, silicon, or polycrystalline silicon.

3. The PUF device of claim 1, wherein the insulating layer comprises $SiO_2$, $Si_3N_4$, or a polymer.

4. The PUF device of claim 1, wherein a switching operation requires less than or equal to 3 V and less than or equal to 100 μA for less than or equal to 400 μs.

5. An array comprising:
   a plurality of copper lines; and
   a plurality of lines comprising W, Ni, Pt, TiN, TaN, TiW, or polycrystalline silicon, the plurality of lines positioned perpendicular to the plurality of copper lines;
   wherein a PUF device is formed at an intersection of the copper lines and the plurality of lines; and
   wherein the intersection comprises a layer of silicon oxide in contact with both the plurality of copper lines and the plurality of lines.

6. The array of claim 5, wherein the PUF device includes a diode.

7. An integrated circuit comprising the array of claim 5.

8. A system comprising:
   an array of devices, wherein each device comprises
      a first copper electrode,
      a second electrode,
      a layer of silicon oxide positioned directly between and in contact with both the first copper electrode and the second electrode; and
      an insulating layer is positioned directly between the second electrode and a circuit,
   wherein the array of devices is partitionable such that a portion of the devices generates information and another portion of the array provides memory storage.

9. The system of claim 8, wherein the devices that generate information are activated to provide a stochastic result.

10. The system of claim 9, wherein the stochastic result is provided by a change in resistance.

11. The system of claim 8, wherein the devices that provide memory storage are forced into a deterministic state provided by a stable change in resistance.

12. The system of claim 8, wherein the array of devices is partitionable based on a change in resistance of the devices.

* * * * *